United States Patent [19]

Ledinh et al.

[11] Patent Number: 5,150,202
[45] Date of Patent: Sep. 22, 1992

[54] SEPARABLE DIAMOND SHAPED MULTIDIMENSIONAL FILTERS FOR COMPOSITE VIDEO ENCODING/DECODING APPLICATIONS

[75] Inventors: Chon T. Ledinh, Brossard; Huu L. Huynh, Montreal, both of Canada

[73] Assignee: Centre de Recherche Industrielle du Quebec, Sainte-Foy, Canada

[21] Appl. No.: 597,346

[22] Filed: Oct. 15, 1990

Related U.S. Application Data

[63] Continuation-in-part of Ser. No. 543,409, Jun. 26, 1990.

[30] Foreign Application Priority Data

Apr. 27, 1990 [CA] Canada .................................. 2015587

[51] Int. Cl.⁵ .............................................. H04N 9/78
[52] U.S. Cl. ............................................ 358/31; 358/23
[58] Field of Search ................ 358/31, 23, 24, 39, 358/40

[56] References Cited

U.S. PATENT DOCUMENTS

| | | | |
|---|---|---|---|
| 4,240,105 | 12/1980 | Faroudja | 358/31 |
| 4,345,268 | 8/1982 | Clarke | 358/31 |
| 4,500,912 | 2/1985 | Bolger | 358/31 |
| 4,670,773 | 2/1987 | Silverberg | 358/12 |
| 4,683,490 | 7/1987 | Strolle et al. | 358/31 |
| 4,829,367 | 5/1989 | Dubois et al. | 358/31 |

FOREIGN PATENT DOCUMENTS

| | | |
|---|---|---|
| 59-171386 | 9/1984 | Japan . |
| 63-82087 | 4/1988 | Japan . |
| 1-41392 | 2/1989 | Japan . |
| 1-41393 | 2/1989 | Japan . |

OTHER PUBLICATIONS

Three-dimensional pre-and post-filtering for PAL TV signals, Detlef Teichner, IEEE 1988, pp. 205-227.

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

Various 2D and 3D diamond shaped filters for encoding and decoding NTSC, PAL and ATV signals are presented. The particularity of the proposed system is its separability: the desired filter configurations are composed of multiple simple 1D filters operating individually in their own zero or oblique frequency axis. In comparison with existing diamond shaped filters the proposed systems offer substantial advantages, low complexity and better performance along the zero axes (horizontal, vertical and temporal) in the frequency domain.

49 Claims, 15 Drawing Sheets

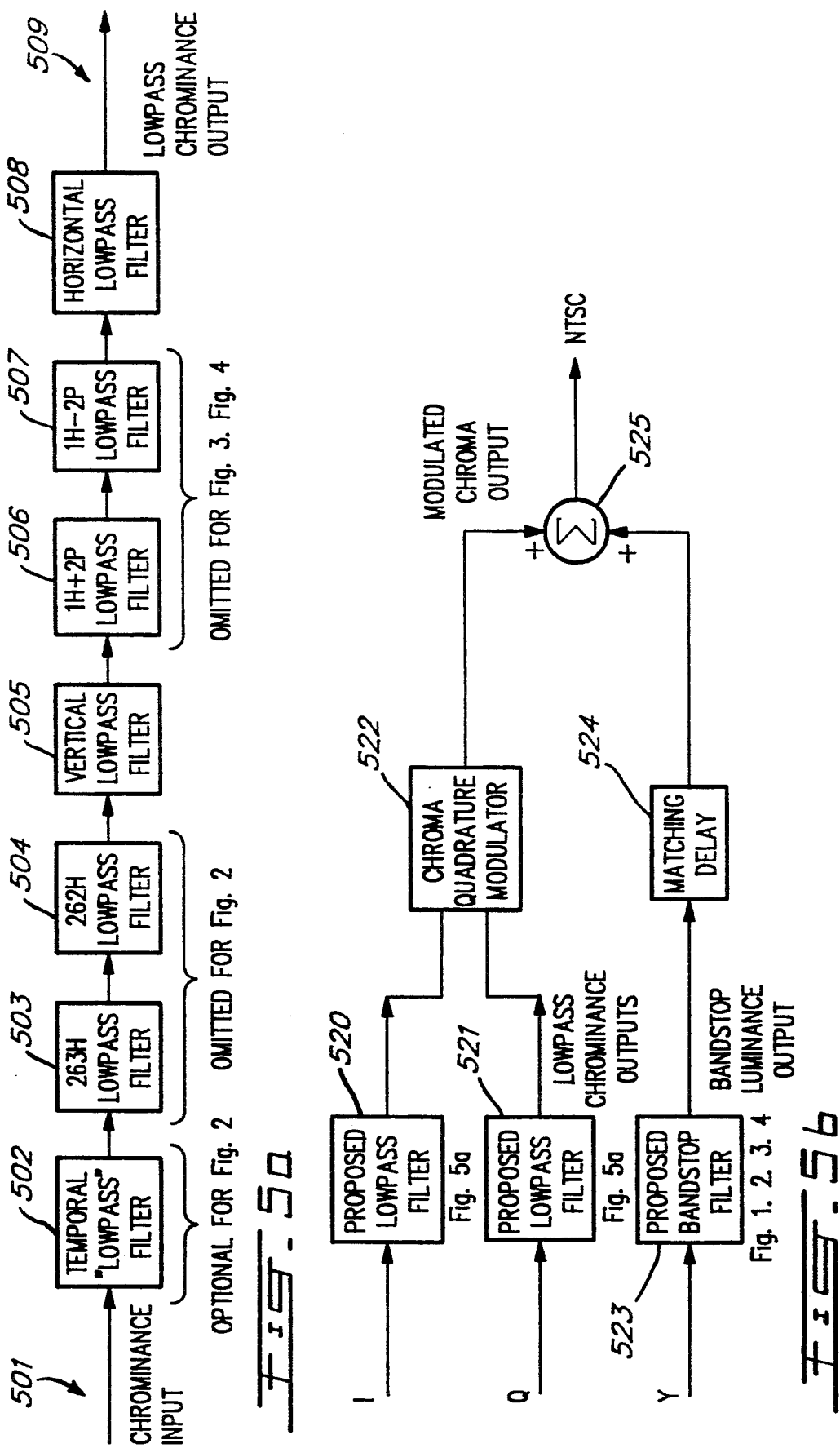

HORIZONTAL

VERTICAL

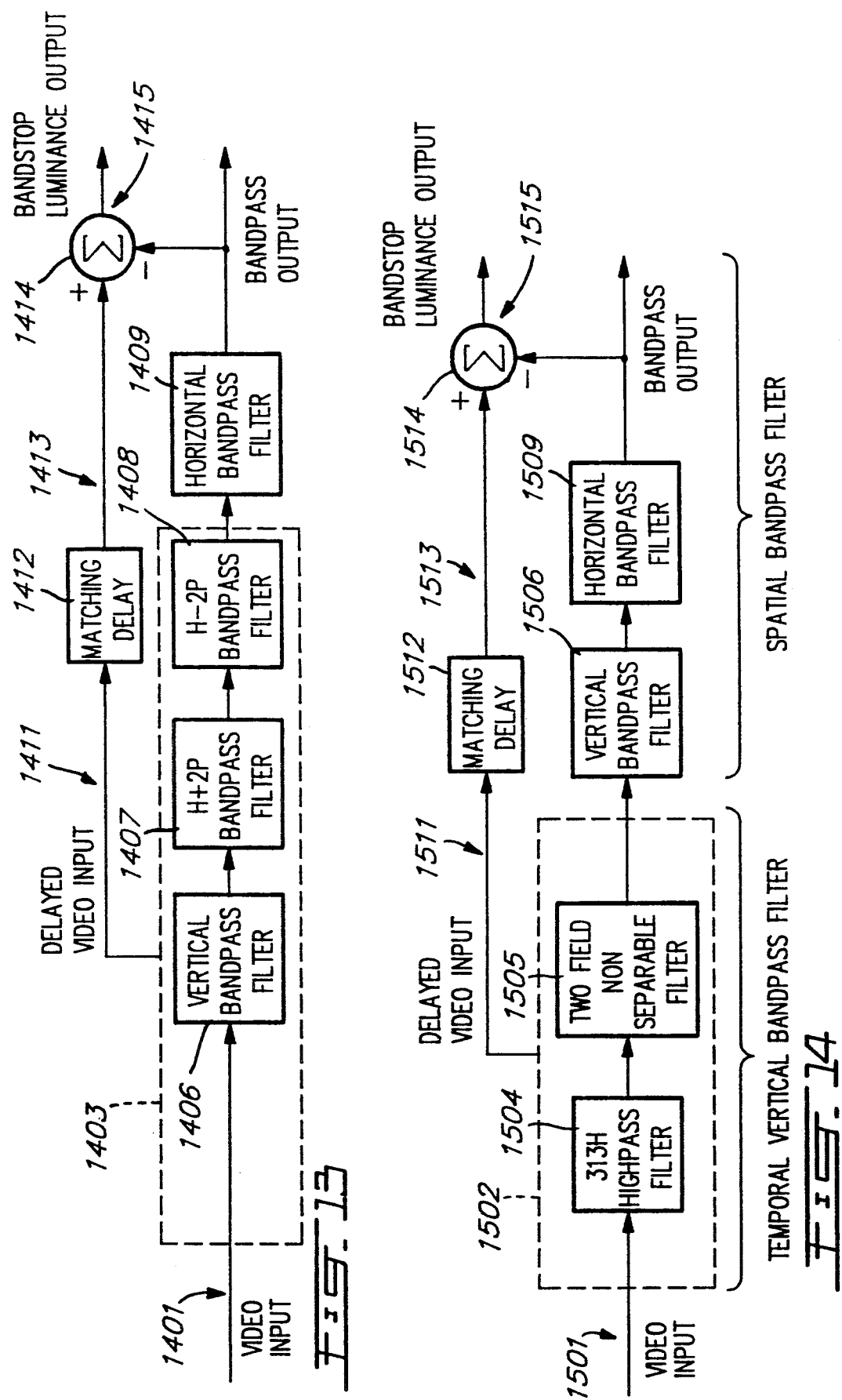

SEPARABLE DIAMOND SHAPED MULTIDIMENSIONAL FILTERS FOR COMPOSITE VIDEO ENCODING/DECODING APPLICATIONS

This is a continuation-in-part application of parent application Ser. No. 07/543,409 filed Jun. 26, 1990.

BACKGROUND OF THE INVENTION

1. Field of the Invention

This invention relates to an apparatus for encoding/decoding a composite color video signal and more particularly, to a multidimensional filter for the separation of the luminance and chrominance components of NTSC, PAL and ATV color television signals. The present invention also relates to a method for designing several classes of diamond shaped filter.

2. Description of the Prior Art

During the past few years, there has been an increasing use of vertical delay line comb filters for improving the horizontal separation of the luminance and chrominance componests in a composite TV signal. Several separable filters respectively in the horizontal and vertical domains have been implemented with analog or digital techniques as disclosed in U.S. Pat. Nos. 4,345,268; 4,500,912 and 4,524,400. However, this class of filters yield a resolution loss of diagonal high frequency luminance information. Therefore, some adaptation and/or compensation techniques were suggested such as disclosed in U.S. Pat. Nos. 4,040,084 and 4,240,105. However adaptation artifacts can be introduced in the viewed image.

Recently there was introduced the diamond shaped spectrum of the chrominance components in an NTSC encoded signal, and U.S. Pat. No. 4,829,367 teaches the use of non-separable horizontal vertical diamond shaped filters for NTSC encoding and decoding. These non-separable filters are generally complex and the luminance bandstop filter performance is not ideal along the horizontal and vertical frequency domain axes.

In the vertical temporal domain, U.S. Pat. No. 4,683,490 describes the use of diamond shaped filters implements with odd and even field delays and suitable lowpass and highpass filter coefficients. However, the proposed twelve field filter yields a limit of 15 dB for component separation along the zero axes. The inventors have also suggested the use of frame sampled filters which are simply rectangular shaped bandpass or bandstop filters in the vertical temporal frequency domain.

In the case of encoding/decoding a PAL video signal, the situation is quite similar. In an article by J.O. Drewery, entitled "The Filtering of Luminance and Chrominance Signals to Avoid Cross-Colour in a PAL Colour System", BBC Engineering, 8-39, September 1976, there is proposed some (separable) rectangular or (non-separable) circular shaped filters in the spatial frequency domain. The choice of circular shaped region remains intuitive and yields a relatively simple filter calculation. In the vertical-temporal domain. Drewery and C.K.P. Clarke, in an article entitled "PAL Decoding: Multidimensional Filter Design for Chrominance-Luminance Separation", BBC Research Department Report no BBC-RD 1988/11, have suggested also the use of odd and even field delays for diamond shaped filter implementation. The filter performance is similar to that of filter performance of U.S. Pat. No. 4,683,490, in the case of NTSC signal.

Finally, it is noted that all existing proposed filters have the diamond shaped region in either the horizontal-vertical or vertical-temporal domain.

SUMMARY OF INVENTION

It is a feature of the present invention to provide a general separable 3D diamond shaped filter in both horizontal-vertical and vertical-temporal domains for encoding/decoding an NTSC video signal. The filter includes a matching delay, an adder and the cascaded connection of seven unidimensional filters working individually in their own zero or oblique frequency axis.

Another feature of the present invention is to provide economical versions of diamond shaped filters in only one of the above-mentioned domains.

A further feature of the present invention is to provide diamond shaped filters obtained by combining separable and simple unidimensional filters.

A still further feature of the present invention is to provide a class of NTSC encoding/decoding filters capable of preserving the luminance information along the three zero axis in frequency domain.

Another feature of the present invention is to provide a diamond shaped filter in the spatial frequency domain for encoding/decoding a PAL video signal.

Yet another objective of the present invention is to provide a high quality but economical 3D separable filter using few field delays for encoding/decoding a PAL video signal.

A still further feature of the present invention is to provide several 3D diamond shaped filters allowing the use of the Fukinuki hole for ATV applications. Fukinuki, Hirano, entitled "Extended Definition TV Fully Compatible with Existing Standard", IEEE Trans. on Communications, vol. COM32, no. Aug. 8, 1986, pp. 948-953.

According to a broad aspect of the present invention, there is provided a diamond shaped multidimensional filter circuit for decoding composite video signals. The diamond shaped filter circuit is comprised of a series configuration of separable filters connected at an input to the composition video signals. A matching delay circuit is connected to the input and provides a delayed output signal matching the delay of the resulting signal of the series of separable filters. The series configuration produce a chrominance signal at an output thereof. An adder circuit is provided and has a positive and a negative input. The negative input is connected to the chrominance output to receive the chrominance signal. The delayed output signal is connected to the positive input of the adder whereby the adder will yield a bandstop luminous signal at an output thereof.

According to a still further broad aspect of the present invention, there is provided a diamond shaped multidimensional filter circuit for encoding composite video signals. The diamond shaped filter circuit comprises two series configuration of separable unidimensional lowpass filters connected respectively to two chrominance input signals and producing two lowpass chrominance output signals. A chroma quadrature modulator is connected to the lowpass chrominance output signals and provides a modulated chroma output signal. A separable diamond shaped filter is connected to a luminance input signal and produces a bandstop luminance output signal. A matching delay circuit is connected to the bandstop luminance output signal and provides a delayed luminance output signal matching the delay of the modulated chroma output signal. An adder is connected to the delayed luminance output signal and the modulated chroma output signal and produces at the output thereof a composite video signal.

According to a still further broad aspect of the present invention, there is provided a diamond shaped multidimensional filter circuit for encoding composite video signals. The circuit comprises a chroma quadrature modulator connected to chrominance input signals. A matching delay circuit is connected to a luminance input signal. The chroma quadrature modulator has an output connected to a negative input of a first adder circuit. The first adder circuit has a positive input connected to the luminance input signal. The adder circuit yields an output signal which is fed to a bandpass filter formed of a series connection of separable filters. The output of the bandpass filter is connected to a negative input of a second adder circuit. The delayed luminance output signal is fed to a positive input of the second adder circuit whereby the second adder circuit yields a composite video output signal.

According to a still further broad aspect of the present invention, there is provided a method of decoding composite video signals by the use of a diamond shaped multidimensional filter circuit. The method comprises feeding the composite video signals to an input of the series configuration of separable filters. The composite video signals are also fed to a matching delay circuit. The matching delay circuit produces a delayed video output signal which is matched to the delay caused by the series of separable filters. A chrominance signal is produced at an output of a series of separable filters to produce an output chrominance signal. The output of the separable filters is fed to an adder circuit negative input. The delayed video output signal is fed to a positive input of the adder whereby the adder will produce a bandstop luminance signal at an output thereof.

According to a still further broad aspect of the present invention, there is provided a method of encoding composite video signals by the use of a diamond shaped multidimensional filter circuit. The method comprises feeding chrominance input signals to two series configuration of separable unidimensional lowpass filters to produce lowpass chrominance output signals. The lowpass chrominance output signals are modulated to produce a modulated chrominance signal. A luminance input signal is fed to a series configuration of separable unidimensional filters to produce a bandpass luminance output signal and to a matching delay circuit to provide a delayed luminance output signal matching the delay of the separable series connected filters. The delayed luminance output signal and the bandpass luminance output signal are fed to a positive input and negative input, respectively, of an adder circuit to provide a bandstop luminance output signal. The bandstop luminance output signal is delay-matched to produce a delayed bandstop luminance output signal having the same delay as the modulator chroma output signal. The modulated chroma output signal and the delayed bandstop luminance output signal are fed to an adder circuit to produce at an output thereof a composite video signal.

BRIEF DESCRIPTION OF THE DRAWINGS

A preferred embodiment of the present invention will now be described with reference to the accompanying drawings in which:

FIG. 5A is a block diagram of chroma encoding lowpass filter associated with FIGS. 1, 2, 3, and 4;

FIG. 5B is a block diagram of luminance chrominance non-complementary encoding filter using the circuit of FIGS. 1, 2, 3, 4, and 5.

FIG. 13 is a block diagram of the proposed spatial diamond shaped separable bandpass-bandstop filter for PAL encoding/decoding;

FIG. 14 is a block diagram of the proposed PAL 3D bandpass-bandstop filter in which the diamond shaped feature in the spatial domain is removed;

DESCRIPTION OF THE PREFERRED EMBODIMENTS

Figure 1:
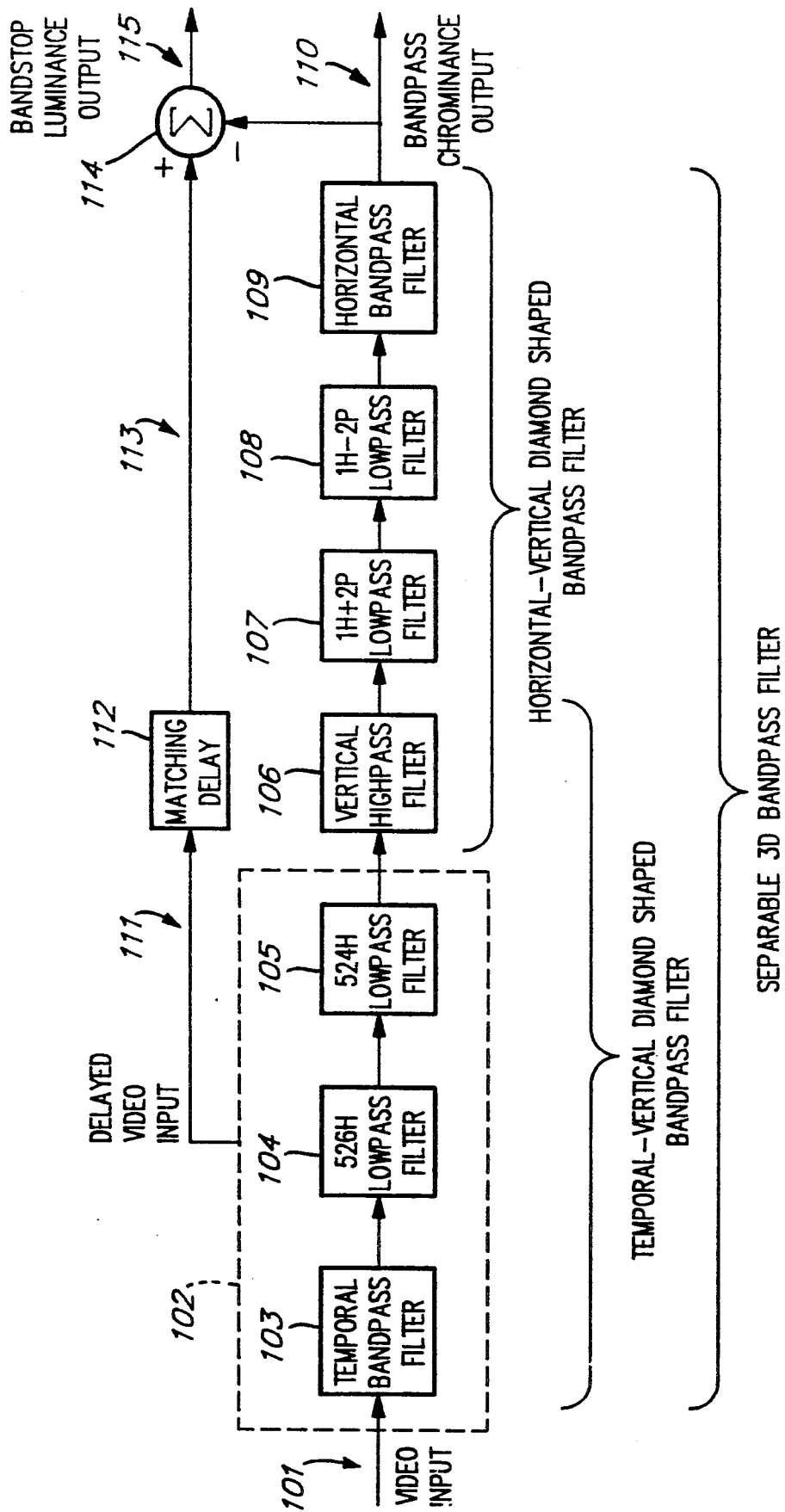
FIG. 1 is a block diagram of the proposed interframe 3D diamond shaped separable bandpass-bandstop filter for NTSC encoding/decoding.

Referring now to the drawings, and more particularly to FIG. 1, there is illustrated the proposed interframe 3D diamond shaped bandpass-bandstop filter of the invention for NTSC encoding and decoding. It consists generally of a matching delay 112, and adder 114 and a separable 3D diamond shaped bandpass filter. The proposed bandpass filter is composed of seven small filters in series, namely: temporal bandpass filter 103, 526H lowpass filter 104, 524H lowpass filter 105, vertical highpass filter 106, 1H+2P lowpass filter 107, 1H−2P lowpass filter 108 and finally horizontal bandpass or highpass filter 109. The filter position ordering is not an important factor for the system's functionality. However, in order to minimize the matching delay 112, the filter which produces the longest delay will be placed at the beginning of the sequence. In the present case, there are three possible candidates: the temporal bandpass filter 103, and the 526H or 524H lowpass filters 104, 105, respectively. These three filters together with 106 form the diamond shaped temporal-vertical bandpass filter. The other filters 106, 107, 108, 109 form a horizontal-vertical diamond shaped filter.

The video input 101, orthogonally sampled at four times the color subcarrier frequency, is supplied to the first filter input. The appropriate delayed input 111 produced by the first filter is sent, in turn, to the matching delay 112. The bandpass output 110 is sent together with the matching delay output 113, respectively to the negative and positive inputs of the adder 114 which yields the bandstop luminance output 115. In the decoding case, the bandpass output 110 corresponds to the modulated chroma output.

Figure 6:
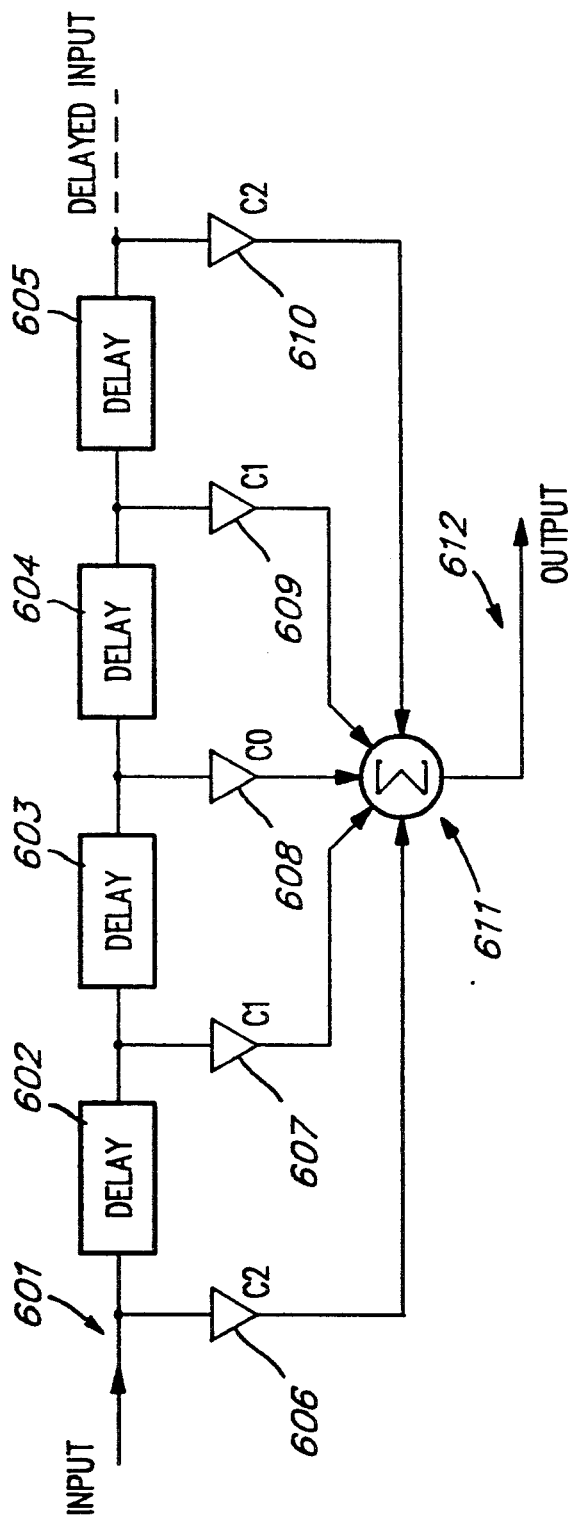
FIG. 6 is a block diagram of a FIR 1D filter which may be used in the circuit of FIGS. 1, 2, 3, 4, and 5.

Considering now, in detail, the seven filters which form the desired separable diamond shaped 3D bandpass filter. These filters are simply FIR undimensional filters working individually in their own and appropriate dimensions. FIG. 6 illustrates a finite impulse response 1D filter and the associated delay to various types of filter. The transfer functions of the seven filters in FIG. 1 are respectively:

The temporal band filter:

$$c_0 + 2 \sum_{n=1} c_n \cos 2n\omega_3 \tag{1}$$

The 526H lowpass filter:

$$c_0 + 2 \sum_{n=1} c_n \cos n(2\omega_3 + \omega_2) \tag{2}$$

The 524H lowpass filter:

$$c_0 + 2 \sum_{n=1} c_n \cos n(-2\omega_3 + \omega_2) \tag{3}$$

The vertical highpass filter:

$$c_0 + 2 \sum_{n=1} c_n \cos n\omega_2 \tag{4}$$

The 1H+2P lowpass filter:

$$c_0 + 2 \sum_{n=1} c_n \cos n(2\omega_1 + \omega_2) \tag{5}$$

The 1H−2P lowpass filter:

$$c_0 + 2 \sum_{n=1} c_n \cos n(-2\omega_1 + \omega_2) \tag{6}$$

The horizontal bandpass filter:

$$c_0 + 2 \sum_{n=1} c_n \cos 2n\omega_1 \tag{7}$$

In these above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i / f_{si}, \tag{8}$$

in which i=1, 2, 3 and the corresponding sampling frequencies $f_{si}$ are $$f_{s1} = 4 f_{sc} = 14.32 \text{ MHz} \tag{9}$$

$$f_{s2} = 262.5 \text{ c/ph or cycle/picture height} \tag{10}$$

$$f_{s3} = 59.94 \text{ Hz} \tag{11}$$

The pair of filters 104 and 105 yields diamond shaped in the vertical-temporal domain. In similar manner, the filters 107 and 108 form diamond regions in the horizontal-vertical domain.

It is worthwhile to note that similar filters with the sampling frequency $f_{SI} = 13.5$ MHz can be used. However, it is necessary to take some precaution in filter design about the offset between 13.5 MHz/4 and the color subcarrier frequency.

Figure 7:
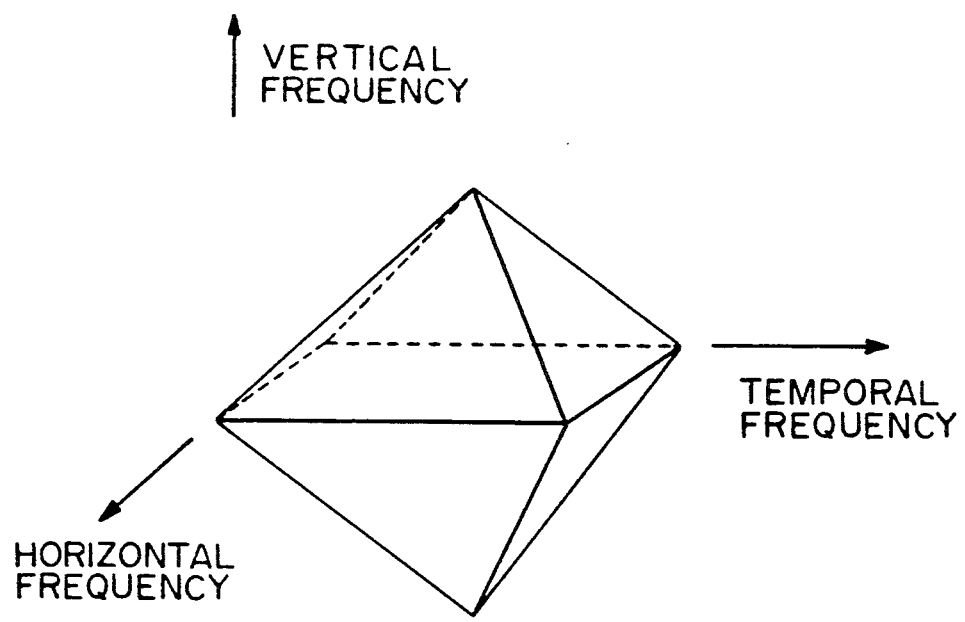
FIG. 7 is a perspective view of a general spatial-temporal spectrum form of the filter of FIG. 1.

FIG. 7 illustrates a portion of spatial-temporal spectra form of the resulting filter in FIG. 1. It is pointed out that in the horizontal-temporal frequency domain the filter shape is not a diamond. This consideration is based on the true spectrum of various image sequences.

Moreover, by using the frame delay, the resulting bandpass-bandstop filters in FIG. 1 are suitable for both chroma and Fukinuki hole informations.

Various filter coefficients for the configuration in FIG. 1 are given in Table 1. There is a filter with 16 fields. It is noted that the filter coefficients are simple and the coefficient multiplications can be implemented using adders.

TABLE I

FILTER COEFFICIENTS FOR FIG. 1
FILTER WITH 16 FIELDS

| FILTER | 103 109 | 104 105 | 106 | 107 108 |
|---|---|---|---|---|
| $c_0$ | 48/128 | 200/128 | 150/512 | 200/128 |
| $c_1$ | −32/128 | −36/128 | −112/512 | −36/128 |
| $c_2$ | 8/128 | | 48/512 | |
| $c_3$ | | | −15/512 | |
| $c_4$ | | | 5/512 | |
| $c_5$ | | | −1/512 | |

Figure 2:
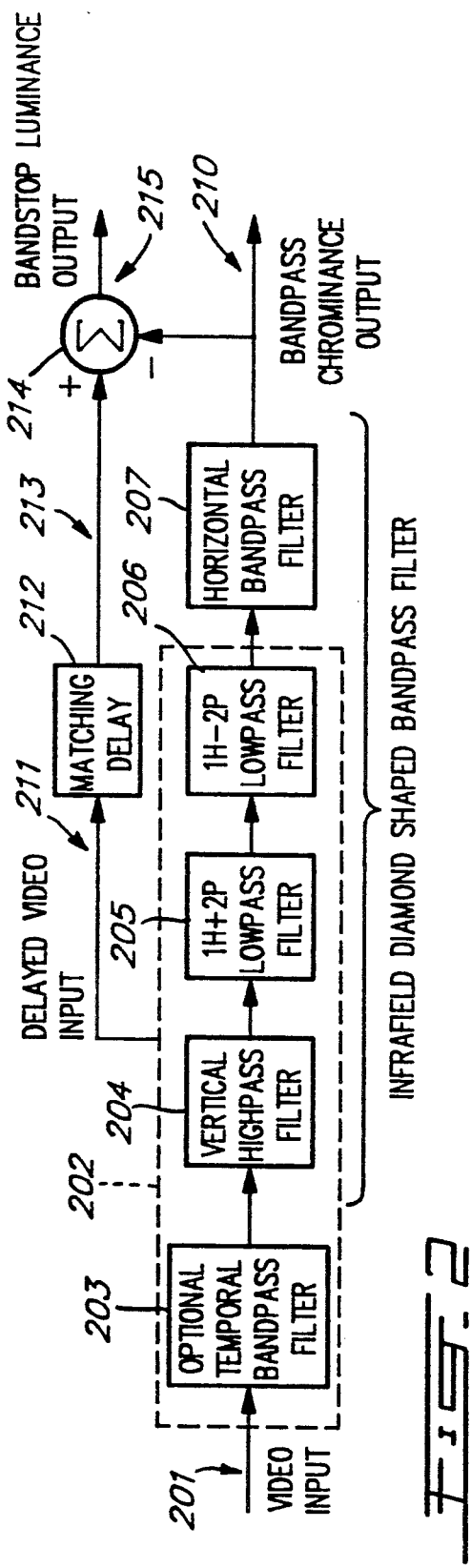
FIG. 2 is a block diagram of the proposed spatial diamond shaped separable bandpass-bandstop filter with an optional temporal bandpass filter for NTSC encoding/decoding.

Referring now to FIG. 2 which illustrates the simplest version of the previous filter, it is a separable diamond shaped filter working essentially in the intra-field spatial domain. The proposed bandpass filter consists of five small filters in series: optional temporal bandpass filter 203, vertical highpass filter 204, 1H+2P lowpass filter 205, 1H−2P lowpass filter 205 and horizontal bandpass filter 207.

The transfer functions of these filters are given respectively in equations (1), (4), (5), (6) and (7).

Figure 8:
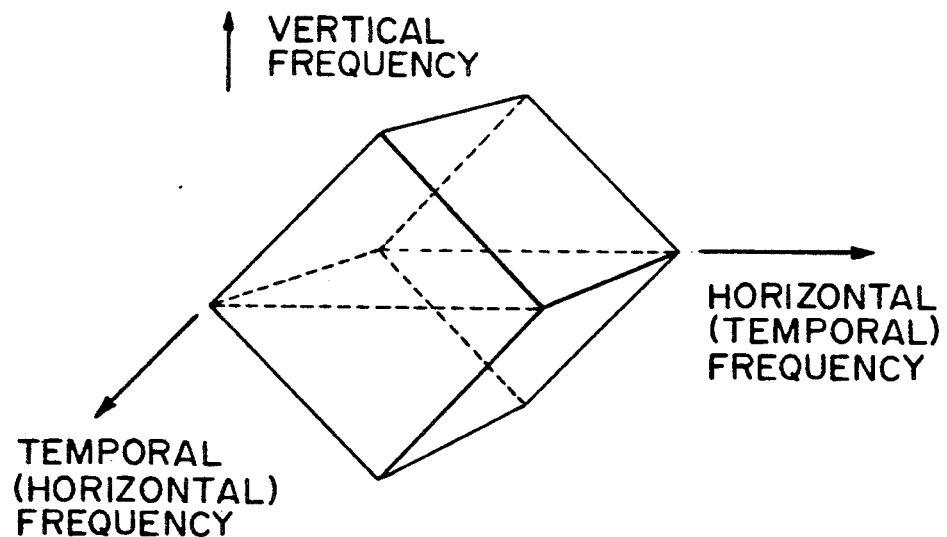
FIG. 8 is a perspective view of a general spatial-temporal spectrum form of the filters of FIG. 2, 3, and 4.

FIG. 8 represents a portion of spatial-temporal spectra form of the resulting filter of FIG. 2. The diamond shaped characteristic is only in the horizontal-vertical frequency domain. The optional bandpass 203 limits the filter spread in the temporal frequency domain.

As an example, the coefficients of a filter with 12 lines are given in Table II. The optional temporal bandpass filter coefficients are also given for completeness. An eight field filter yields good result. Of course, different filters can be obtained according to desired specifications.

TABLE II

FILTER COEFFICIENTS FOR FIG. 2 FILTER WITH 12 LINES AND 8 OPTIONAL FIELDS

| FILTER | OPTIONAL 203 | 204 207 | 205 206 |
|---|---|---|---|
| $C_0$ | 80/128 | 48/128 | 100/128 |
| $C_1$ | −32/128 | −32/128 | 32/128 |
| $C_2$ | −8/128 | 8/128 | −18/128 |

Figure 11:
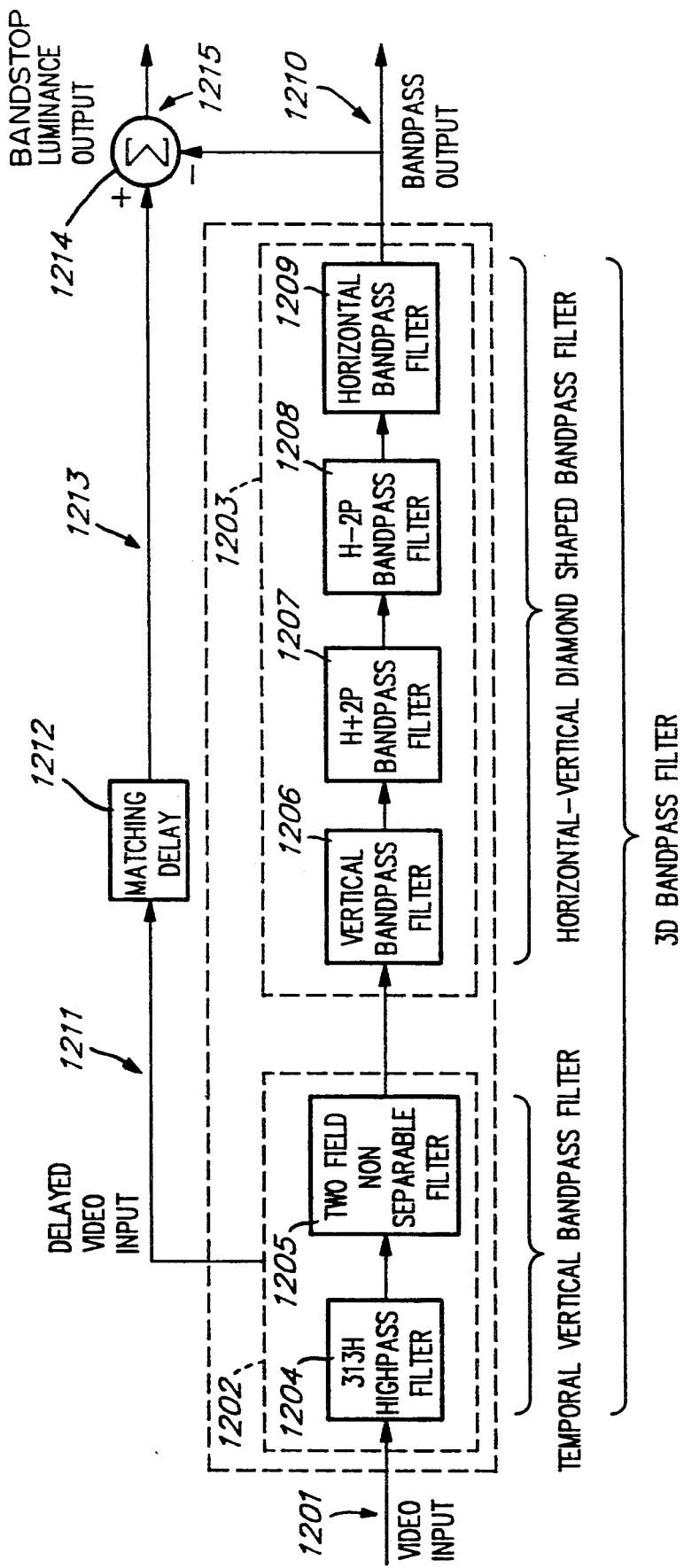
FIG. 11 is a block diagram of the proposed PAL 3D separable bandpass-bandstop filter.

FIG. 11 represents the spatial spectral characteristics of the filter defined by the given coefficients.

It is noted that, in order to reduce the frame store memory, the optional temporal bandpass filter in FIG. 2 can be designed using IIR, infinite impulse response, filter techniques.

Figure 3:
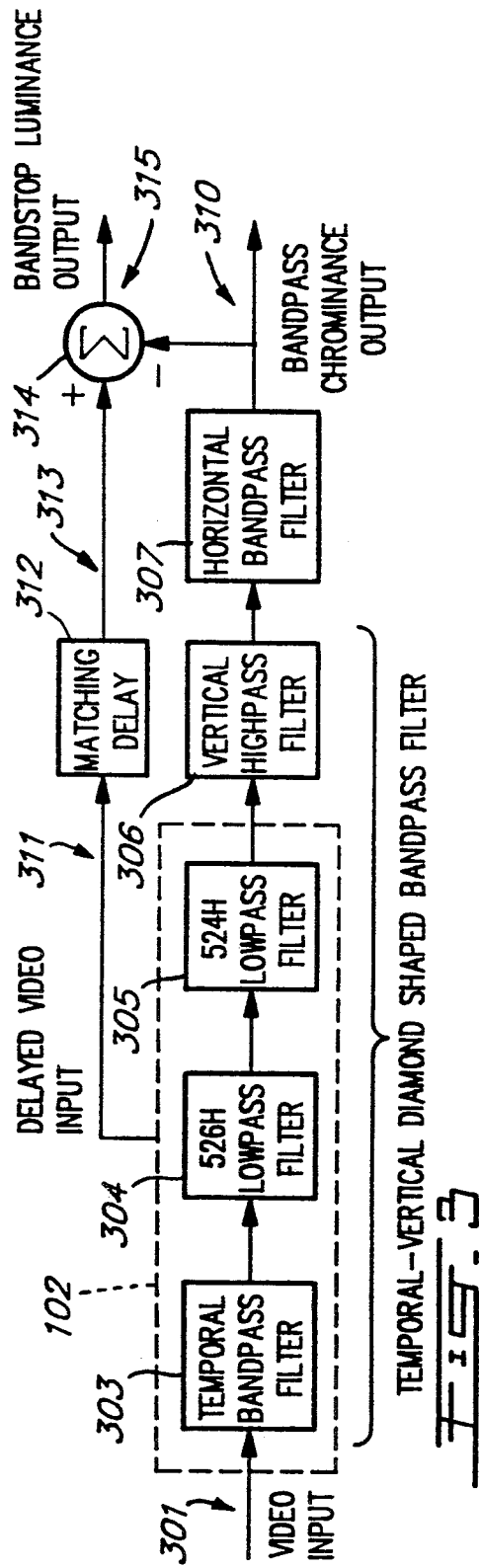
FIG. 3 is a block diagram of the proposed NTSC interframe diamond shaped separable bandpass-bandstop filter.

Referring now to FIG. 3, there is illustrated the proposed interframe separable bandpass-bandstop filter for NTSC encoding decoding. It is a simplified version of the filter of FIG. 1. The bandpass filter is composed of five small filters in series: temporal bandpass filter 303, 526H lowpass filter 304, 524H lowpass filter 305, vertical highpass filter 306, horizontal bandpass filter 307.

The transfer functions of these filters are given respectively in equations (1), (2), (3), (4) and (7).

FIG. 8 illustrates the 3D spectral characteristics of the filter of FIG. 3. In this case, the diamond shaped characteristic is in the temporal-vertical frequency domain. Table III shows the 14 field filter coefficients as an example.

TABLE III

FILTER COEFFICIENTS FOR FIG. 3 FILTER WITH 14 FIELDS

| FILTER | 303 306 | 304 305 | 307 |
|---|---|---|---|
| $C_0$ | 64/128 | 160/128 | 64/128 |
| $C_1$ | −32/128 | −16/128 | −37/128 |
| $C_2$ |  |  | 0 |
| $C_3$ |  |  | 5/128 |

Figure 4:
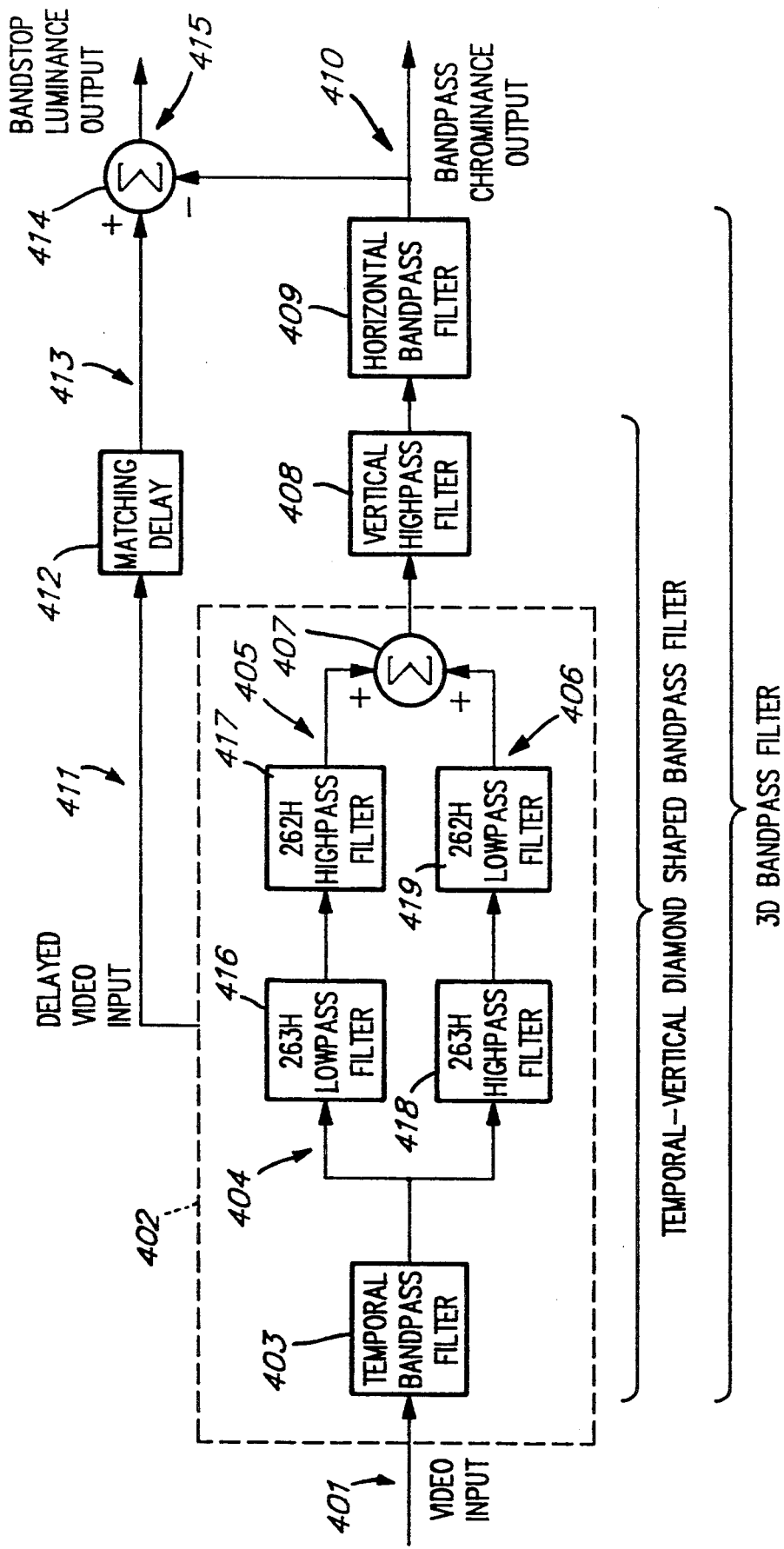
FIG. 4 is a block diagram of the proposed NTSC interfield diamond shaped separable bandpass-bandstop filter for both chroma and Fukinuki hole informations.

Referring now to FIG. 4 there is illustrated the proposed NTSC interfield separable bandpass-bandstop filter for both chroma and Fukinuki hole informations. The 3D bandpass filter is composed of seven filters 403, 408, 409, 416, 417, 418, 419 and an adder 407. The video signal 401 is applied to the input of the temporal bandpass filter 403. The filter output 404 is sent, in parallel, to both filters 416, 418 followed respectively by the filters 417, 419. The respective outputs 405, 406 of the above filters are combined together to the adder 407 followed, in series, by the vertical highpass filter 408 and the horizontal bandpass filter 409. The resulting signal 410 is the 3D bandpass filter output.

The transfer functions of the filters 403, 408 and 409 are described respectively by equations (1), (4) and (7).

The 263H filters 416 and 418 have the following expression as transfer function:

$$c_0 + 2 \sum_{n=1} c_n \cos n(\omega_3 + \tfrac{1}{2}\omega_2) \tag{12}$$

Finally for the 262H filters 417 and 419:

$$c_0 + 2 \sum_{n=1} c_n \cos n(-\omega_3 + \tfrac{1}{2}\omega_2) \tag{13}$$

The diamond shaped filter region, similar to that of the previous interframe filter, is in the temporal-vertical frequency domain as illustrated by FIG. 8.

From an encoding point of view, the FIGS. 1, 2, 3, and 4 are suitable only for the luminance component. FIG. 5A illustrates the associated lowpass filter chroma encoding. In the complete case corresponding to FIG. 1, the proposed chroma lowpass filter includes the cascade connection of seven unidimensional lowpass filters 502, 503, 504, 505, 506, 507, and 508. The transfer functions of the filters 502, 503, 504, 505, 506, and 507 are given respectively by equations (1), (12), (13), (4), (5), and (6). For the horizontal lowpass filter 508, the transfer function is described as follows:

$$c_0 + 2 \sum_{n=1} c_n \cos n\omega_1 \tag{14}$$

Associated with FIG. 2, the encoding chroma lowpass filter illustrated in FIG. 5A contains only five filters 502 (optional), 505, 506, 507, and 508 in series. As for the case of FIGS. 3 and 4, the corresponding chroma lowpass filter is composed of 502, 503, 504, 505, and 508.

The above described filters can be used for NTSC encoding as shown in FIGS. 5 and 6. FIG. 5B consists of two proposed separable diamond shaped lowpass filters 520, 521, respectively for the two chroma components I and Q, a chroma quadrature modulator 522, a proposed separable diamond shaped bandstop filter 523 for the luminance component Y, a matching delay 524, and an adder 525.

Figure 5C:
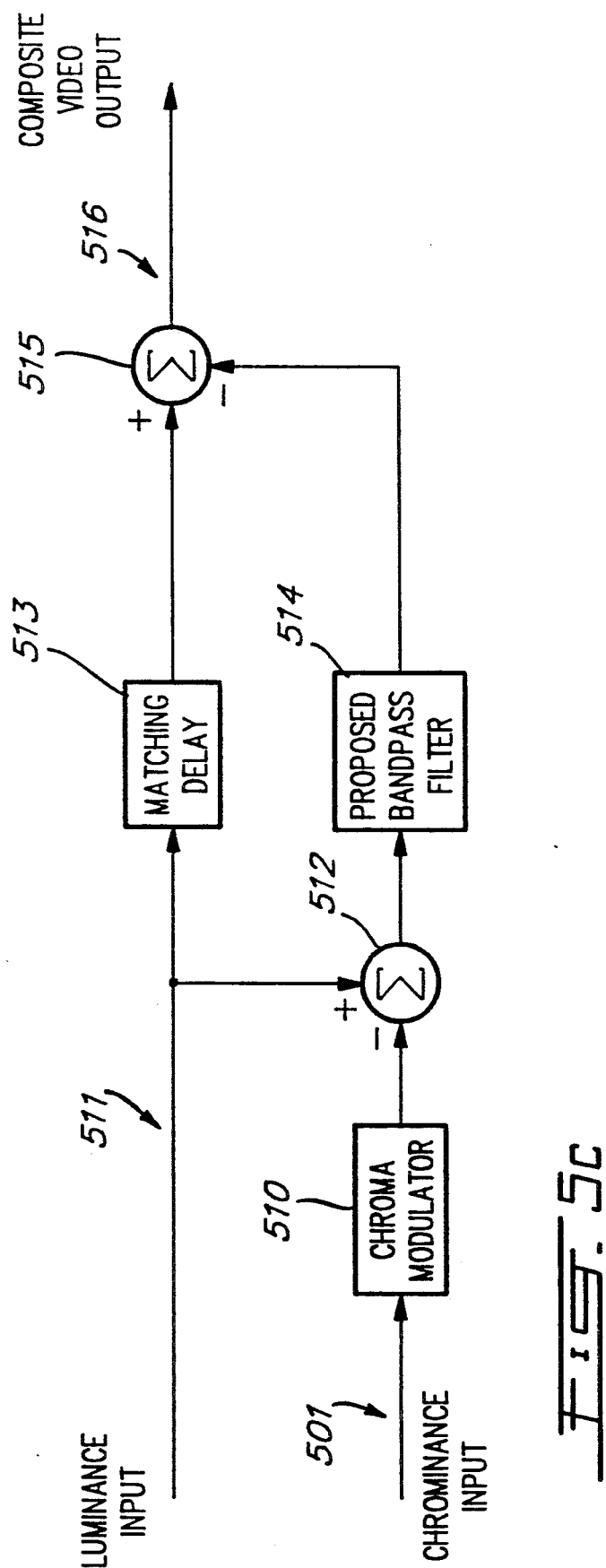
FIG. 5C is a block diagram of a luminance chrominance complementary encoding filter with the proposed bandpass filters shown in FIGS. 1, 2, 3, and 4.

Referring now to FIG. 5C, there is shown a complementary filter for both luminance-chrominance encoding. Since this configuration is well known, it is sufficient to mention that the bandpass filter 514 is now one of the previously described bandpass filter in FIGS. 1, 2, 3, and 4.

Having described the preferred embodiments concerning NTSC encoding/decoding, we now consider the PAL video signal.

Referring now to FIG. 11, there is shown the proposed configuration of the PAL interfield 3D separable filter which is composed of six filters 1204, 1205, 1206, 1207, 1208 and 1209. The video input 1201, quasi-orthogonally sampled at $4 f_{sc}$ is applied to the filter input. The transfer functions of the six filters in FIG. 11 are given respectively as follows:

The horizontal bandpass filter 1209:

$$c_0 + 2 \sum_{n=1} c_n \cos 2n\omega_1 \tag{15}$$

The H−2P bandpass filter 1208:

$$c_0 + 2 \sum_{n=1} c_n \cos 2n(2\omega_1 - \omega_2) \tag{16}$$

The H+2P bandpass filter 1207:

$$c_0 + 2 \sum_{n=1} c_n \cos 2n(2\omega_1 + \omega_2) \tag{17}$$

The vertical bandpass filter 1206:

$$c_0 + 2 \sum_{n=1} c_n \cos 2n\omega_2 \quad (18)$$

The 313 H highpass filter 1204:

$$c_0 + 2 \sum_{n=1} c_n \cos n(\omega_3 + \tfrac{1}{2}\omega_2) \quad (19)$$

Figure 12:
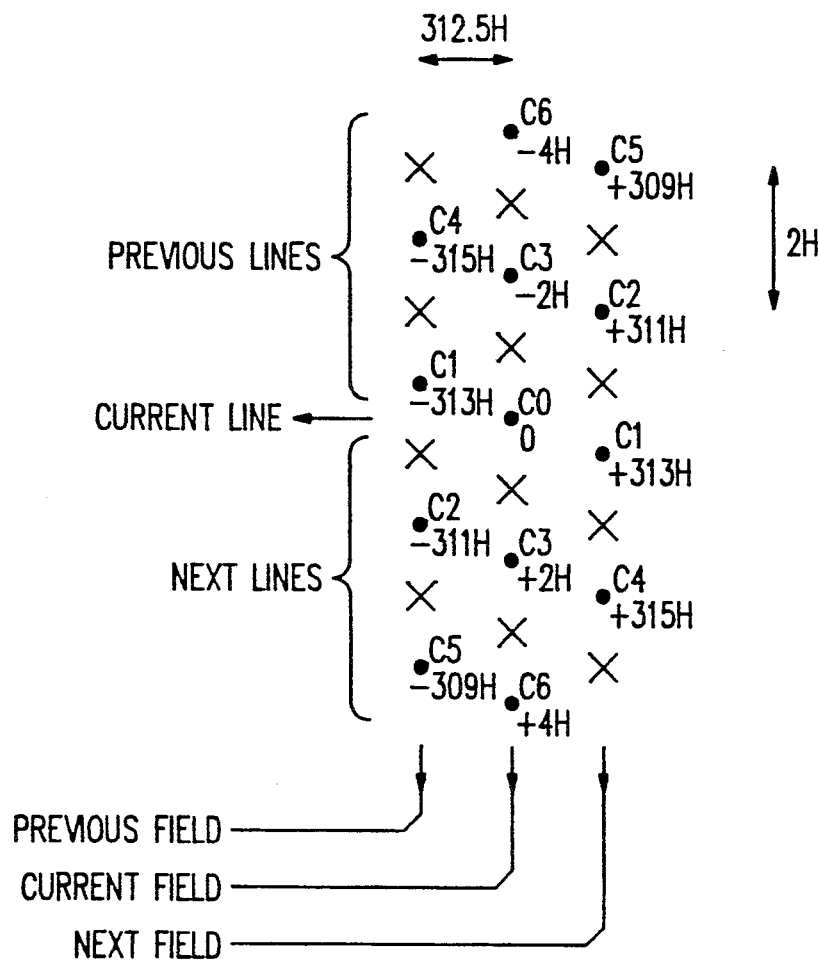
FIG. 12 represents the weight array notation for the two field non-separable bandpass filter 1205.

The two field non separable bandpass filters 1205:

$$[c_0 + 2c_1 \cos(\omega_3 + \tfrac{1}{2}\omega_2) + 2c_2 \cos(\omega_3 - 3/2\omega_2) + \quad (20)$$

$$2c_3 \cos 2\omega_2 + 2c_4 \cos(\omega_3 + 5/2\omega_2) +$$

$$2c_5 \cos(\omega_3 - 7/2\omega_2) + 2c_6 \cos 4\omega_2 + \ldots ]$$

in which the coefficients $c_0, c_1, \ldots c_6$ are illustrated in a weight array as shown in FIG. 12.

The normalized frequencies $\omega_1, \omega_2, \omega_3$ respectively to the horizontal, vertical and temporal frequencies are defined as follows:

$$\omega_i = 2\pi f_i/f_{si}, \; i=1,2,3 \quad (21)$$

in which the corresponding sampling frequencies are $$f_{s1} = 4f_{sc} = 17.73 \text{ MHz} \quad (22)$$

$$f_{s2} = 312.5 \text{ c/ph} \quad (23)$$

$$f_{s3} = 50 \text{ Hz} \quad (24)$$

It is pointed out that according to desired specifications, various filter coefficients can be obtained.

Figure 17:
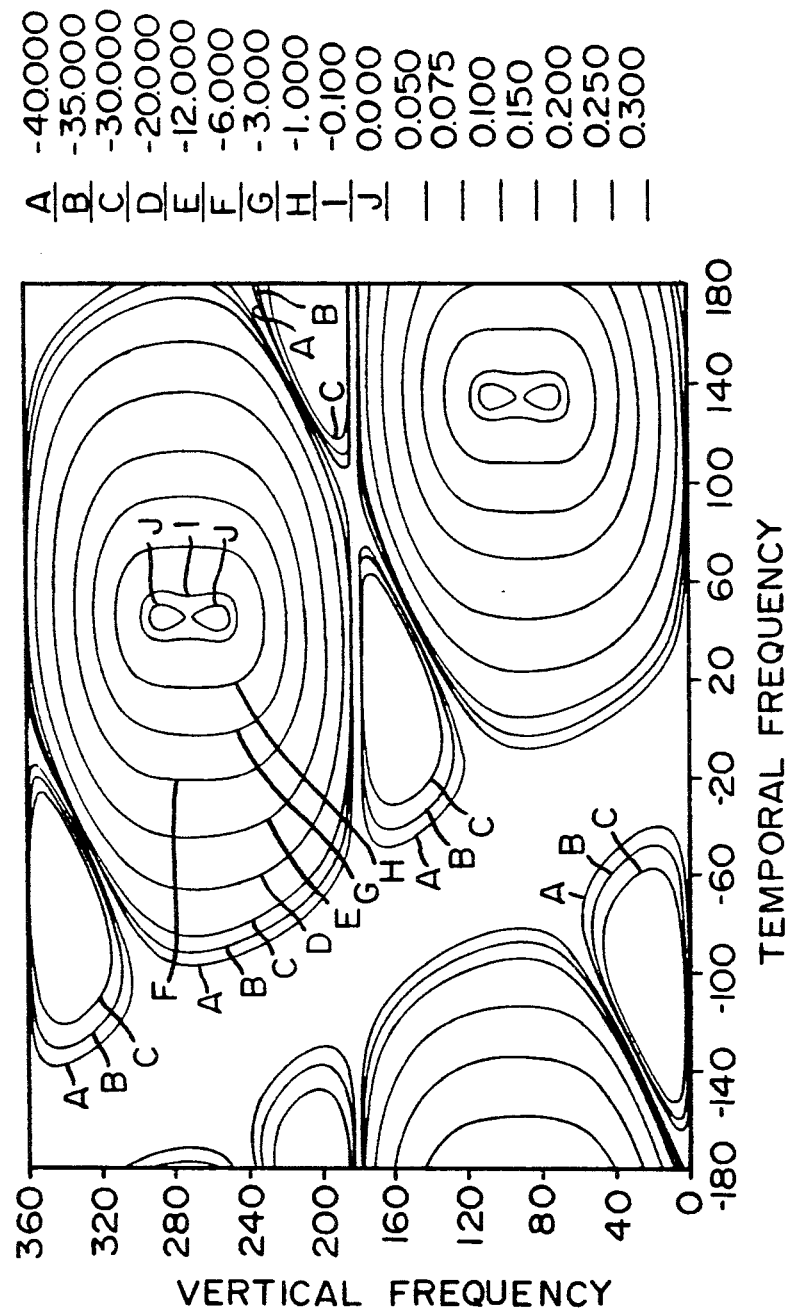
FIG. 17 illustrates temporal-vertical spectral characteristics of the filter 1202 or 1502.

Various filter coefficients for the configuration in FIG. 11 are given in Table IV. There are two filters using respectively 4 and 6 fields. It is interesting to note that:

Primo, in the temporal vertical frequency domain, the filter 1202 spectral shape, illustrated by FIG. 17, is not yet a diamond. However, the shape is locally symmetrical around the subcarrier frequency center. This feature is important in a double sideband modulation system.

Secundo, the horizontal bandpass filter 1209 is lengthy, it is then desirable to decompose it in two or more small filters in series. The equation (15) becomes:

$$\left[ a_0 + 2 \sum_{n=1} a_n \cos 2n\omega_1 \right] \cdot \left[ b_0 + 2 \sum_{n=1} b_n \cos 2n\omega_1 \right]$$

The coefficients $a_n$ and $b_n$ are choosen as follows:

| | | | |
|---|---|---|---|
| $a_0 =$ | 128/512 | $b_0 =$ | 110/256 |
| $a_1 =$ | −110/512 | $b_1 =$ | −72/256 |
| $a_2 =$ | 64/512 | $b_2 =$ | 12/256 |
| $a_3 =$ | −19/512 | $b_3 =$ | 8/256 |
| $a_4 =$ | 0 | $b_4 =$ | −3/256 |
| $a_5 =$ | 1/512 | | |

TABLE IV

FILTER COEFFICIENTS FOR FIG. 11

| FILTER | 1209 | 1208 1207 | 1206 | 1205 | 1204 |
|---|---|---|---|---|---|
| | | Filter with 4 Fields | | | |
| $C_0$ | see | 166/128 | $\tfrac{1}{2}$ | 10/32 | $\tfrac{1}{2}$ |
| $C_1$ | text | 19/128 | $-\tfrac{1}{4}$ | −5/32 | $-\tfrac{1}{4}$ |
| $C_2$ | | | | 5/32 | |
| $C_3$ | | see | | −4/32 | |
| $C_4$ | | text | | −1/32 | |
| $C_5$ | | | | 1/32 | |
| $C_6$ | | | | −1/32 | |
| | | Filter with 6 Fields | | | |
| $C_0$ | see | 166/128 | $\tfrac{1}{2}$ | 78/256 | 6/16 |
| $C_1$ | text | 19/128 | $-\tfrac{1}{4}$ | −39/256 | −4/16 |
| $C_2$ | | | | 47/256 | 1/16 |
| $C_3$ | | | | −32/256 | |
| $C_4$ | | | | −15/256 | |
| $C_5$ | | | | 7/256 | |
| $C_6$ | | | | −7/256 | |

Tertio, in order to obtain a larger chroma bandwidth the coefficients in the two filters 1207 and 1208 can be changed as follows:

$C_0 = 46/32$ $C_1 = 8/32$ $C_2 = 1/32$

Referring now to the drawings, FIG. 13 represents a block diagram of the proposed spatial (horizontal, vertical) diamond shaped bandpass bandstop filter for PAL encoding/decoding. It contains only four filters 1409, 1408, 1407, 1406 in series. The corresponding transfer functions are given respectively by equations (15), (16), (17) and (18). The filter coefficients are the same given in Table IV respectively in the corresponding columns 1209, 1208, 1207 and 1206. FIG. 17 illustrates the spatial spectral filter characteristics.

FIG. 14 illustrates a block diagram of the proposed PAL 3D filter in which the diamond shaped feature in the spatial domain is removed. It contains four filters 1509, 1506, 1505 and 1504 in series. The filter transfer functions are given respectively in equations (15), (18), (20) and (19). The coefficients of the filters 1505 and 1504 can be chosen as the same given in Table IV respectively in the corresponding columns 1205 and 1204. However, the coefficients of the filter 1506 and 1509 can be obtained by any filter design program satisfying given desired specifications.

Figure 15:
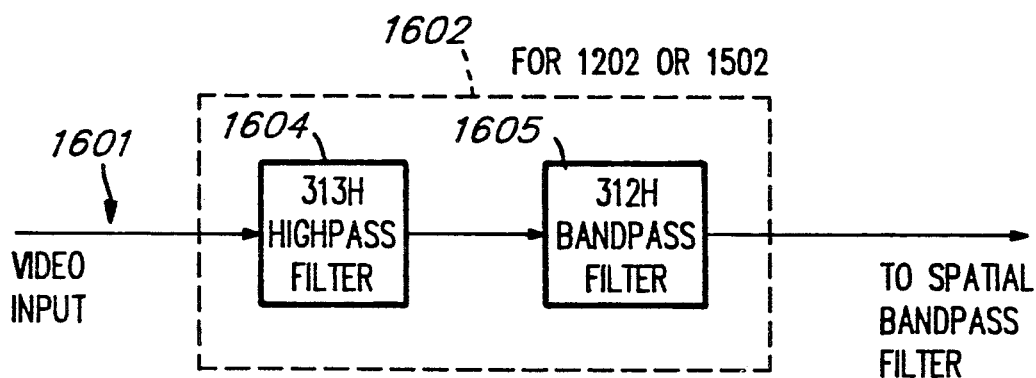
FIG. 15 is a block diagram of the proposed temporal-vertical completely separable diamond shaped PAL bandpass filter.

FIG. 15 represents another proposed block diagram of the diamond shaped temporal-vertical PAL bandpass filter. It is completely separable by two 1D filters 1604, 1605 in series. The transfer function of the 313H highpass filter 1604 is described already by equation (19). The transfer function of the 312H bandpass filter 1605 is given as follows:

$$c_0 + 2 \sum_{n=1} c_n \cos n(2\omega_3 - \omega_2) \quad (25)$$

Figure 18:
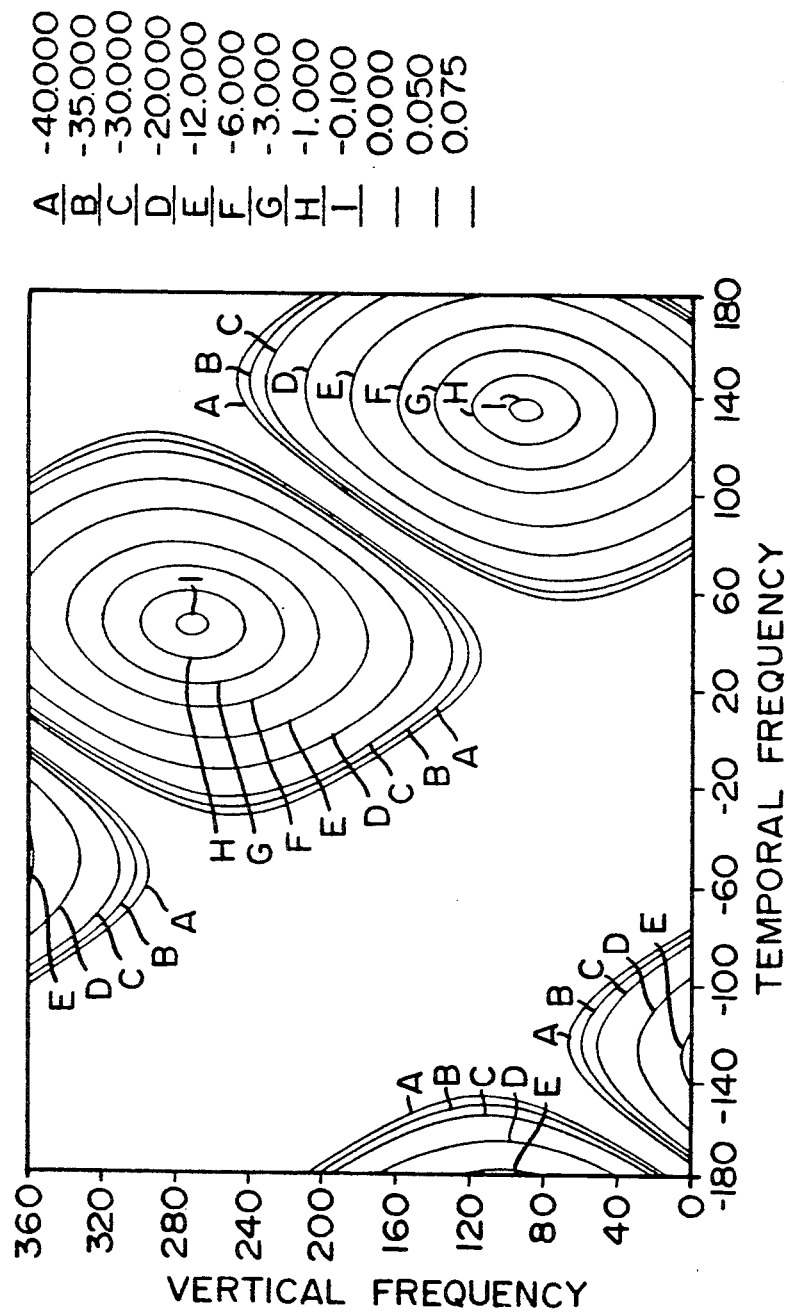
FIG. 18 represents temporal-vertical spectral characteristics of the filter 1602.

Table V resumes the employed coefficients for three bandpass filters using 10, 12 and 16 fields respectively. FIG. 18 illustrates the 10 field filter response in the temporal-vertical frequency domain.

If the diamond shaped characteristics in the temporal-vertical frequency domain is desired, at the expense of frame stores, the blocks 1202 or 1502 in FIGS. 11 or 14 respectively can be substituted by the 1602 in FIG. 15.

TABLE V

| | FILTER COEFFICIENTS FOR FIG. 15 | | | | | |
|---|---|---|---|---|---|---|
| | 10 FIELDS | | 12 FIELDS | | 16 FIELDS | |
| FILTER | 1605 | 1604 | 1605 | 1604 | 1605 | 1604 |
| $C_0$ | ½ | 72/256 | ½ | 70/256 | ½ | 244/1024 |
| $C_1$ | −¼ | −58/256 | −¼ | −56/256 | −¼ | −208/1024 |
| $C_2$ | | 28/256 | | 28/256 | | 131/1024 |
| $C_3$ | | −3/256 | | −8/256 | | −56/1024 |
| $C_4$ | | | | 1/256 | | 6/1024 |
| $C_5$ | | | | | | 8/1024 |
| $C_6$ | | | | | | −3/1024 |

Figure 9C:
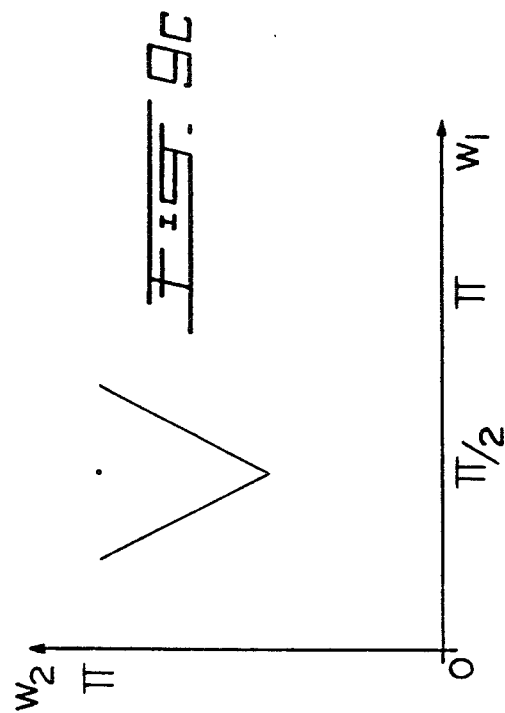
FIGS. 9A, B, and C illustrate as example, the spectral result of the 1H+2P and 1H−2P lowpass filters in series.
Figure 9A:
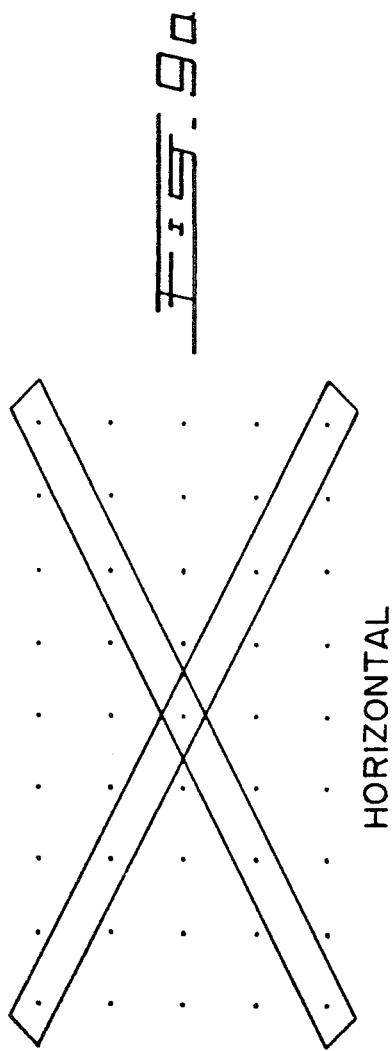
Figure 9B:
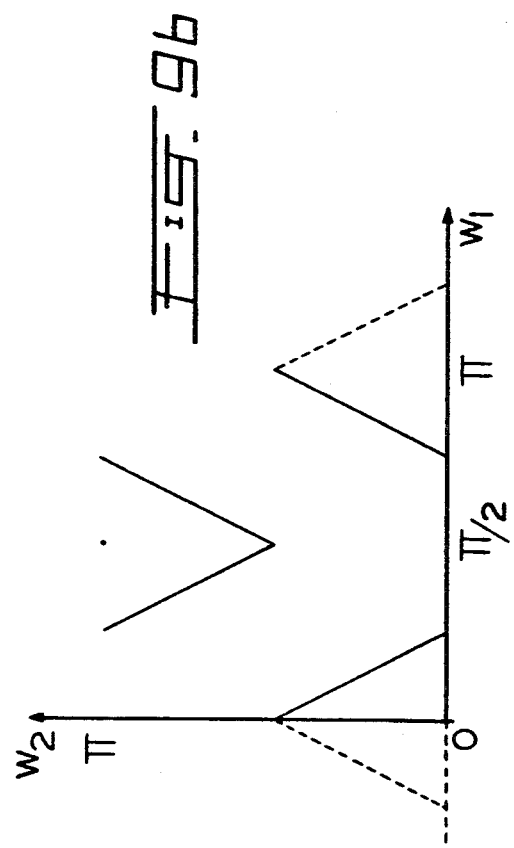
Figure 10A:
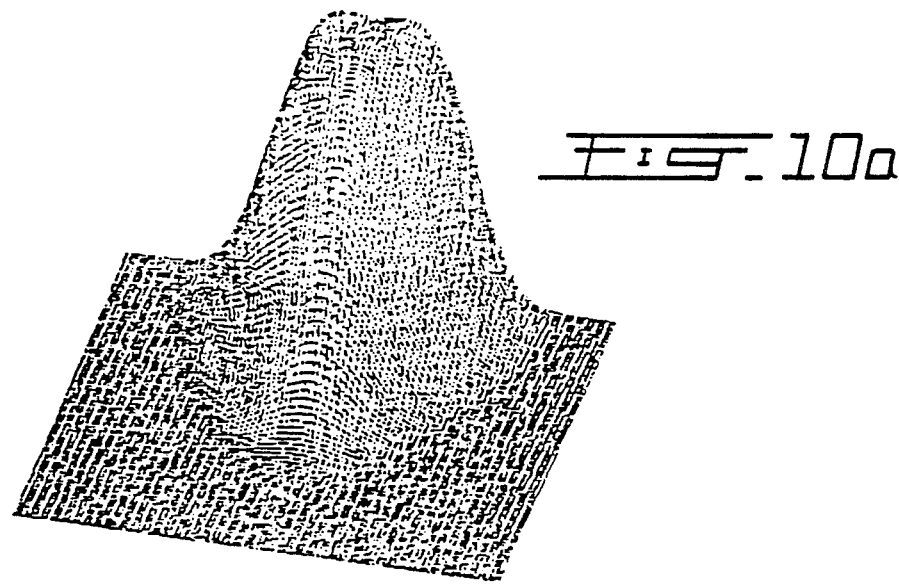
FIGS. 10A, B, C, and D are perspective views and graphs illustrating as example, spectral characteristics of the spatial diamond shaped filter of FIG. 2.
Figure 10B:
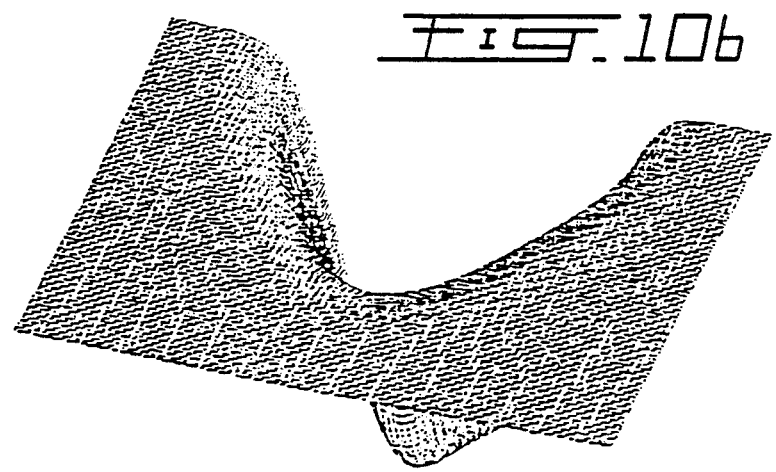
Figure 10C:
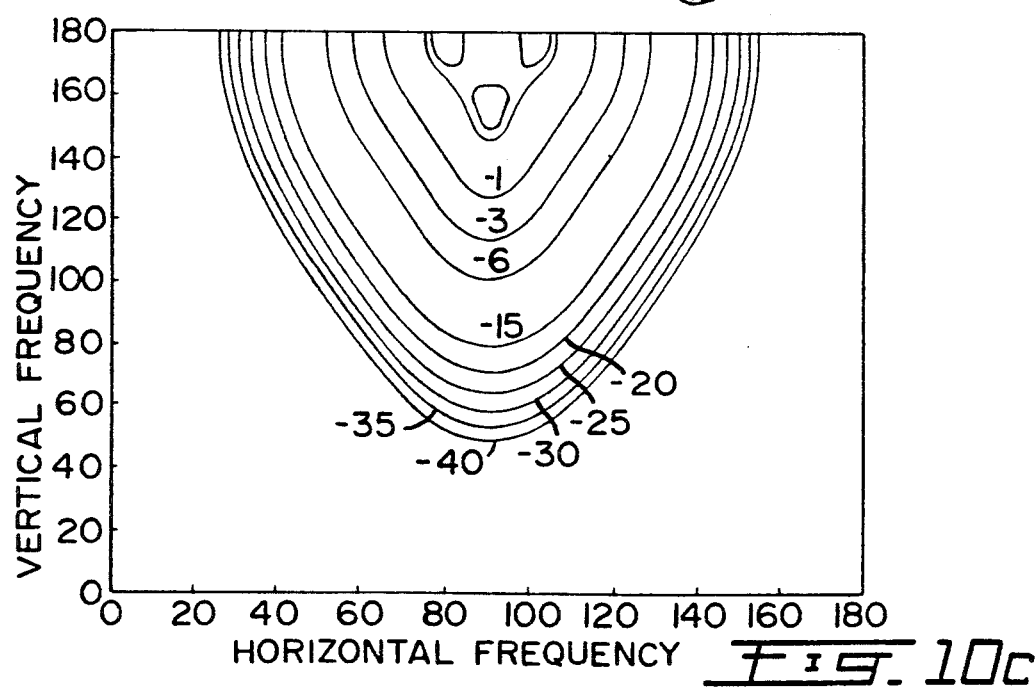
Figure 10D:
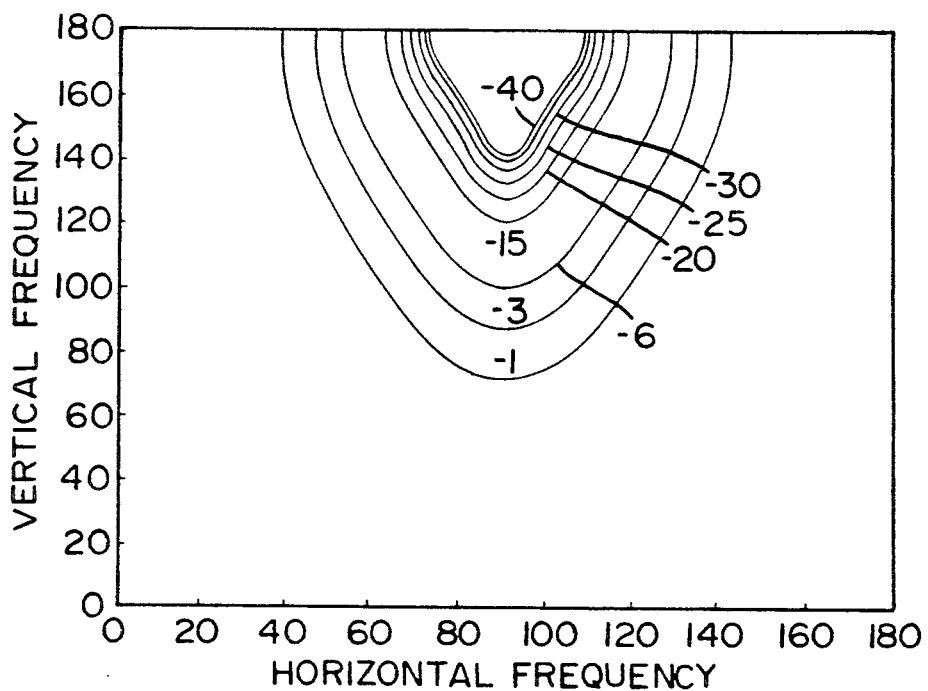
Figure 16:
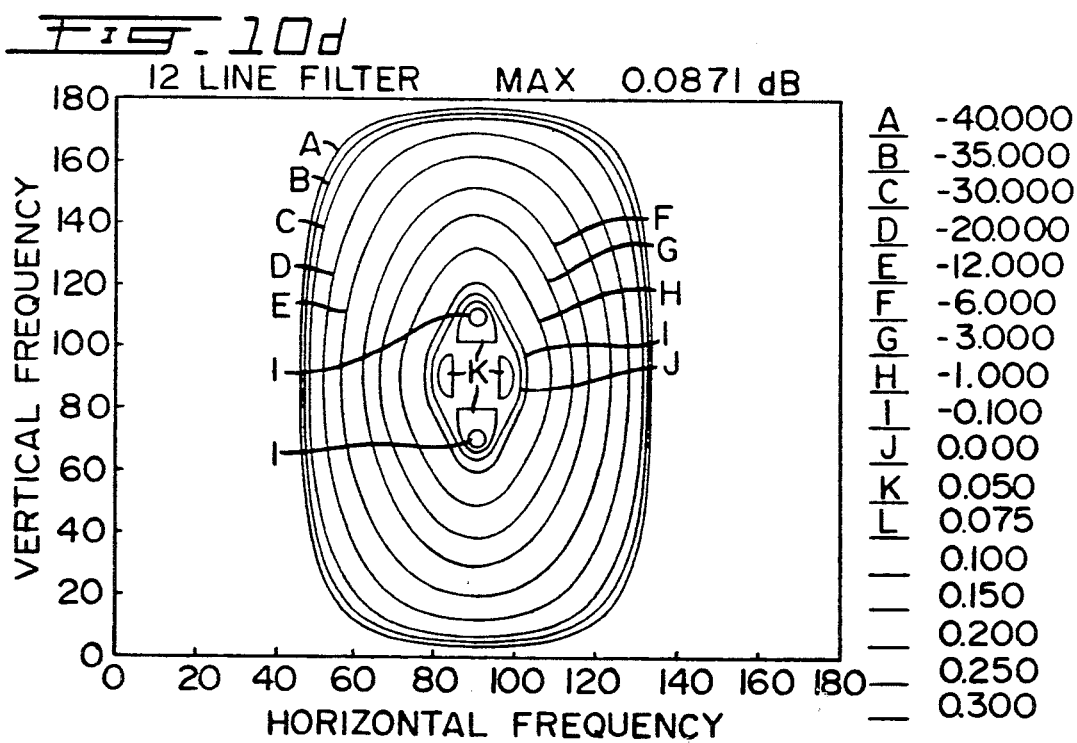
FIG. 16 is a graph illustrating as example, spectral characteristics of the spatial diamond shaped PAL filter of FIG. 13.

Various diamond shaped filters are herein proposed for encoding/decoding the NTSC, PAL and ATV video signals. These filters are separable and, therefore, implemented by introducing various oblique frequency axes such as $(2\omega_1+\omega_2, 2\omega_1-\omega_2)$ for NTSC, PAL spatial filter, $(2\omega_3+\omega_2, 2\omega_3-\omega_2)$ for interframe filter, $(\omega_3+\tfrac{1}{2}\omega_2, \omega_3-\tfrac{1}{2}\omega_2)$ for interfield filter. This can be explained briefly as follows. Let us consider, for example, the pair of 1H+2P and 1H−2P lowpass filters. Referring to FIG. 9A, there is represented the spatial data array of a video signal. The enclosed dots correspond to sampled data stored in these filters for a given central pixel. The cascade connection of these two lowpass filters results in three pass bands in the spatial frequency domain, as illustrated by FIG. 9B. In order to obtain only the desired band shown in FIG. 9C, it is necessary to use a pair of horizontal bandpass and vertical highpass filters in series. The two last filters provide at a same time two main benefits for controlling the diamond shape dimensions and the desired system performance along the zero axes.

We claim:

1. A diamond shaped multidimensional filter circuit for decoding NTSC composite video signals, said diamond shaped filter circuit comprising a series configuration of separable filters connected at an input to said composite video signals, a matching delay circuit connected to said input and providing a delayed output signal matching the delay of the resulting signal of said series of configuration separable filters, said series configuration of separable filters producing a chrominance signal at an output thereof, and adder circuit having a positive and negative input, said negative input being connected to said chrominance output to receive said chrominance signal, said delayed output signal being connected to said positive output, said adder yielding a bandstop luminance signal at an output thereof, said series configuration of separable filters comprising a series combination of separable filters to produce a horizontal-vertical diamond shaped bandpass filter, said series configuration of separable filters producing a bandpass chrominance output signal.

2. A diamond shaped multidimensional filter circuit as claimed in claim 1 wherein said composite video signal is an ATV video signal.

3. A diamond shaped multidimensional filter circuit as claimed in claim 1, wherein said series configuration of separable filters comprises a series combination of separable filters to produce a temporal-vertical bandpass filter.

4. A diamond shaped multidimensional filter circuit as claimed in claim 3 wherein said temporal-vertical bandpass filter is a diamond shaped bandpass filter.

5. A diamond shaped multidimensional filter circuit as claimed in claim 4 wherein said temporal-vertical diamond shaped bandpass filter is comprised of four separable filters and namely a temporal bandpass filter, a 526 H lowpass filter, a 524 H lowpass filter and a vertical highpass filter; said four filters being connected in an operational series arrangement, said composite video signal input being orthogonally sampled at four times the color subcarrier frequency or at 13.5 MHz.

6. A diamond shaped multidimensional filter circuit as claimed in claim 5 wherein one of said four separable filters producing the longest delay is connected to said input video signal and having its appropriate delayed video input connected to said matching delay circuit.

7. A diamond shaped multidimensional filter circuit as claimed in claim 1 or 3 or 4 wherein said horizontal-vertical diamond shaped bandpass filter is comprised of four separable filters and namely a vertical highpass filter, a 1H+2P lowpass filter, a 1H−2P lowpass filter and a horizontal bandpass filter, said four filters being connected in an operational series arrangement.

8. A diamond shaped multidimensional filter circuit as claimed in claim 1 or 3 or 4 wherein said series of separable filters are FIR unidimensional filters working individually in their own and appropriate dimensions.

9. A diamond shaped multidimensional filter circuit as claimed in claim 7 wherein said series of separable filters have transfer functions determined by the following mathematical expressions, for said temporal bandpass filter:

$$c_0 + 2 \sum_{n=1} c_n \cos 2n\omega_3 \qquad (1)$$

said 526 H lowpass filter:

$$c_0 + 2 \sum_{n=1} c_n \cos n(2\omega_3 + \omega_2) \qquad (2)$$

said 524 H lowpass filter:

$$c_0 + 2 \sum_{n=1} c_n \cos n(-2\omega_3 + \omega_2) \qquad (3)$$

said vertical highpass filter:

$$c_0 + 2 \sum_{n=1} c_n \cos n\omega_2 \qquad (4)$$

said 1H+2P lowpass filter:

$$c_0 + 2 \sum_{n=1} c_n \cos n(2\omega_1 + \omega_2) \qquad (5)$$

said 1H−2P lowpass filter:

$$c_0 + 2 \sum_{n=1} c_n \cos n(-2\omega_1 + \omega_2) \qquad (6)$$

said horizontal bandpass filter:

$$c_0 + 2 \sum_{n=1} c_n \cos 2n\omega_1 \qquad (7)$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i/f_{si}. \quad (8)$$

in which i=1, 2, 3 and the corresponding sampling frequencies $f_{SI}$ are $$f_{s1} = 4 f_{sc} = 14.32 \text{ MHz} \quad (9)$$

$$f_{s2} = 262.5 \text{ c/ph or cycle/picture height} \quad (10)$$

$$f_{s3} = 59.94 \text{ Hz} \quad (11)$$

in which $f_{si} = 13.50 \text{ MH}_z$ can be used with similar filters.

10. A diamond shaped multidimensional filter circuit as claimed in claim 1, wherein said series combination of separable filters is an intrafield diamond shaped bandpass filter comprised of an optional temporal bandpass filter operating in the temporal frequency domain, a vertical highpass filter, a 1H+2P lowpass filter, a 1H−2P lowpass lowpass filter and a horizontal bandpass filter, all connected together in series.

11. A diamond shaped multidimensional filter circuit as claimed in claim 10 wherein said intrafield separable bandpass filter has transfer functions determined by the following mathematical expressions, for said optional temporal bandpass filter $$c_0 + 2 \sum_{n=1} c_n \cos 2n\omega_3 \quad (1)$$

said vertical highpass filter:

$$c_0 + 2 \sum_{n=1} c_n \cos n\omega_2 \quad (4)$$

said 1H+2P lowpass filter:

$$c_0 + 2 \sum_{n=1} c_n \cos n(2\omega_1 + \omega_2) \quad (5)$$

said 1H−2P lowpass filter:

$$c_0 + 2 \sum_{n=1} c_n \cos n(-2\omega_1 + \omega_2) \text{ and} \quad (6)$$

said horizontal bandpass filter:

$$c_0 + 2 \sum_{n=1} c_n \cos 2n\omega_1 \quad (7)$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i/f_{si}. \quad (8)$$

in which i=1, 2, 3, and the corresponding sampling frequencies $f_{si}$ are $$f_{s1} = 4 f_{sc} = 14.32 \text{ MHz} \quad (9)$$

$$f_{s2} = 262.5 \text{ c/ph or cycle/picture heigh} \quad (10)$$

$$f_{s3} = 59.94 \text{ Hz} \quad (11)$$

in which $f_{s1} = 13.50$ MHz can be used with similar filters.

12. An interframe diamond shaped multidimensional filter circuit for decoding NTSC composite video signals, said diamond shaped filter circuit comprising a series configuration of separable filters connected to said input to said composite video signals, a matching delay circuit connected to said input and providing a delayed output signal matching the delay of the resulting signal of said series configuration of separable filters, said series configuration of separable filters producing a chrominance signal at an output thereof, an adder circuit having a positive and negative input, said negative input being connected to said chrominance output to receive said chrominance signal, said delayed output signal being connected to said positive output, said adder yielding a bandstop luminance signal at an output thereof, said series configuration of separable filters being a separable temporal-vertical diamond shaped bandpass filter and comprised of a temporal bandpass filter, a 526H lowpass filter, a 524H lowpass filter, a vertical highpass filter and a horizontal bandpass filter, all connected together in series.

13. An interframe diamond shaped multidimensional filter circuit as claimed in claim 12 wherein said series configuration of separable filters has transfer functions determined by the following mathematical expressions, for said temporal bandpass filter:

$$C_0 + 2 \sum_{n=1} c_n \cos 2n\omega_3, \quad (1)$$

for said 526H lowpass filter:

$$C_0 + 2 \sum_{n=1} c_n \cos n(2\omega_3 + \omega_2) \quad (2)$$

for said 524H lowpass filter:

$$C_0 + 2 \sum_{n=1} c_n \cos n(-2\omega_3 + \omega_2) \quad (3)$$

for said vertical highpass filter:

$$C_0 + 2 \sum_{n=1} c_n \cos n\omega_2, \text{ and} \quad (4)$$

for said horizontal bandpass filter:

$$C_0 + 2 \sum_{n=1} c_n \cos 2n\omega_1 \quad (7)$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2f_i/f_{si}, \quad (8)$$

in which i=1, 2, 3 and the corresponding sampling frequencies$_{si}$ are:

$$f_{sl} = 4f_{sc} = 14.32 \text{ MHz} \quad (9)$$

$$f_{s2} = 262.5 \text{ c/ph or cycle/picture height} \quad (10)$$

$$f_{s3} = 59.95 \text{ Hz} \quad (11)$$

in which $f_{si} = 13.50$ MH$_2$ can be used with similar filters.

14. An interfield diamond shaped multidimensional filter circuit for decoding NTSC composite video signals, said diamond shaped filter circuit comprising a series configuration of separable filters connected to said input to said composite video signals, a matching delay circuit connected to said input and providing a delayed output signal matching the delay of the resulting signal of said series configuration of separable filters, said series configuration of separable filters producing a chrominance signal at an output thereof, said series configuration of separable filters being a separable temporal-vertical diamond shaped bandpass filter for both chroma and Fukinuki hole informations in NTSC signals and comprised of a temporal bandpass filter connected to said input containing said composite video signal, said temporal bandpass filter having an output connected to an input of two parallel branches of filters, one branch formed by a 263H lowpass filter connected in series with a 262H highpass filter, the other branch formed by a 263H highpass filter connected in series with a 262H lowpass filter, said two branches of filters being connected at their outputs to a respective input of a further adder circuit where these signals are combined and fed as a composite signal to a vertical highpass filter which is connected in series with a horizontal bandpass filter producing a bandpass chrominance output signal.

15. An interfield diamond shaped multidimensional filter circuit as claimed in claim 14 wherein said series configuration of separable filters has transfer functions determined by the following mathematical expressions, for said temporal bandpass filters, $$c_0 + 2 \sum_{n=1} c_n \cos 2n\omega_3 \quad (1)$$

said vertical highpass filter:

$$c_0 + 2 \sum_{n=1} c_n \cos n\omega_2 \quad (4)$$

and said horizontal bandpass filter:

$$c_0 + 2 \sum_{n=1} c_n \cos 2n\omega_1 \quad (7)$$

said 263H filters $$c_0 + 2 \sum_{n=1} c_n \cos n(\omega_3 + \tfrac{1}{2}\omega_2) \quad (12)$$

said 262H filters $$c_0 + 2 \sum_{n=1} c_n \cos n(-\omega_3 + \tfrac{1}{2}\omega_2) \quad (13)$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i / f_{si}, \quad (8)$$

in which $i = 1, 2, 3$ and the corresponding sampling frequencies $f_{si}$ are $$f_{s1} = 4f_{sc} = 14.32 \text{ MHz} \quad (9)$$

$$f_{s2} = 262.5 \text{ c/ph or cycle/picture heigh} \quad (10)$$

$$f_{s3} = 59.94 \text{ Hz} \quad (11)$$

in which $f_{s1} = 13.50$ MHz can be used with similar filters.

16. A diamond shaped multidimensional filter circuit for encoding composite video signals, said diamond shaped filter circuit comprising a two series configuration of separable unidimensional lowpass filters connected respectively to two chrominance input signals and producing two lowpass chrominance output signals, said series configuration of separable filters comprising a series combination of separable filters to produce a horizontal-vertical diamond shaped bandpass filter, a chroma quadrature modulator connected to said lowpass chrominance output signals and providing a modulated chroma output signal, a separable diamond shaped bandstop filter connected to a luminance input signal and producing a bandstop luminance output signal, a matching delay circuit connected to said bandstop luminance output signal and providing a delayed luminance output signal matching the delay of said modulated chroma output signal, an adder circuit connected to said delayed luminance output signal and said modulated chroma output signal and providing at the output thereof a composite video signal.

17. A diamond shaped multidimensional filter circuit for encoding composite video signals as claimed in claim 16 wherein said series combination of separable filters is an intrafield lowpass, series-connected, filter comprised of an optional temporal lowpass filter, a vertical lowpass filter, a 1H+2 P lowpass filter, a 1H−2 P lowpass filter and a horizontal lowpass filter.

18. A diamond shaped multidimensional filter circuit for encoding composite video signals as claimed in claim 17 wherein said lowpass filters have transfer functions determined by the following mathematical expressions, for said temporal bandpass filter:

$$c_0 + 2 \sum_{n=1} c_n \cos 2n\omega_3 \quad (1)$$

for said vertical lowpass filter:

$$c_0 + 2 \sum_{n=1} c_n \cos n\omega_2 \quad (4)$$

for said 1H+2 P lowpass filter:

$$c_0 + 2 \sum_{n=1} c_n \cos n(2\omega_1 + \omega_2) \quad (5)$$

for said 1H−2 P lowpass filter:

$$c_0 + 2 \sum_{n=1} c_n \cos n(-2\omega_1 + \omega_2) \quad (6)$$

for said horizontal lowpass filter:

$$c_0 + 2 \sum_{n=1} c_n \cos n\omega_1 \quad (14)$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i/f_{si} \quad (8)$$

in which i=1, 2, 3 and the corresponding sampling frequencies $f_{si}$ are $$f_{s1} = 4f_{sc} = 14.32 \text{ MHz} \quad (9)$$

$$f_{s2} = 262.5 \text{ c/ph or cycle/picture height} \quad (10)$$

$$f_{s3} = 59.94 \text{ Hz} \quad (11)$$

in which $f_{s1} = 13.50$ MH$_z$ can be used with similar filters.

19. A diamond shaped multidimensional filter circuit as claimed in claim 16 wherein said series configuration of separable filters comprises a series combination of separable filters to produce a temporal-vertical lowpass filter.

20. A diamond shaped multidimensional filter circuit as claimed in claim 19 wherein said temporal-vertical lowpass filter is a diamond shaped lowpass filter.

21. A diamond shaped multidimensional filter circuit for encoding composite video signals as claimed in claim 20, wherein said series configuration of separable filters is an interframe tri-dimensional filter having seven series connected unidimensional lowpass filters comprised of a temporal lowpass filter, a 263H lowpass filter, a 262H lowpass filter, a vertical lowpass filter, a 1H+2P lowpass filter, a 1H−2P lowpass filter and a horizontal lowpass filter.

22. A diamond shaped multidimensional filter circuit for encoding composite video signals as claimed in claim 21 wherein said lowpass filters have transfer functions determined by the following mathematical expressions, for temporal bandpass filter $$c_0 + 2 \sum_{n=1} c_n \cos 2n\omega_3 \quad (1)$$

for said 263H lowpass filter:

$$c_0 + 2 \sum_{n=1} c_n \cos n(\omega_3 + \tfrac{1}{2}\omega_2) \quad (12)$$

for said 262H lowpass filter:

$$c_0 + 2 \sum_{n=1} c_n \cos n(-\omega_3 + \tfrac{1}{2}\omega_2) \quad (13)$$

for said vertical lowpass filter:

$$c_0 + 2 \sum_{n=1} c_n \cos n\omega_2 \quad (4)$$

for said 1H+2P lowpass filter:

$$c_0 + 2 \sum_{n=1} c_n \cos n(2\omega_1 + \omega_2) \quad (5)$$

for said 1H−2P lowpass filter:

$$c_0 + 2 \sum_{n=1} c_n \cos n(-2\omega_1 + \omega_2) \quad (6)$$

and for said horizontal lowpass filter $$c_0 + 2 \sum_{n=1} c_n \cos n\omega_1 \quad (14)$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i/f_{si} \quad (8)$$

in which i=1, 2, 3 and the corresponding sampling frequencies $f_{si}$ are $$f_{s1} = 4f_{sc} = 14.32 \text{ MHz} \quad (9)$$

$$f_{s2} = 262.5 \text{ c/ph or cycle/picture heigh} \quad (10)$$

$$f_{s3} = 59.94 \text{ Hz} \quad (11)$$

in which $f_{s1} = 13.50$ MH$_z$ can be used with similar filters.

23. A diamond shaped multidimensional filter circuit for encoding composite video signals, said diamond shaped filter circuit comprising a two series configuration of separable unidimensional lowpass filters connected respectively to two chrominance input signals, and producing two lowpass chrominance output signals, a chroma quadrature modulator connected to said lowpass chrominance output signals, said series configuration of separable filters comprising a series combination of separable filters to produce a horizontal-vertical diamond shaped bandpass filter, a chroma quadrature modulator connected to said lowpass chrominance output signals and providing a modulated chroma output signal, a separable diamond shaped bandstop filter connected to a luminance input signal and producing a bandstop luminance output signal, a matching delay circuit connected to said bandstop luminance output signal and providing a delayed luminance output signal matching the delay of said modulated chroma output signal, an adder circuit connected to said delayed luminance output signal and said modulated chroma output signal and providing at the output thereof a composite video signal, said series configuration of separable filters being an interframe or interfield separable temporal-vertical diamond shaped lowpass filter, there being a temporal lowpass filter, a 263H lowpass filter, a 262H lowpass filter, a vertical lowpass filter and a horizontal lowpass filter, all said lowpass filters being connected in series.

24. A diamond shaped multidimensional filter circuit for encoding composite video signals as claimed in claim 23 wherein said lowpass filters have transfer functions determined by the following mathematical expressions, for said temporal lowpass filter:

$$c_0 + 2 \sum_{n=1} c_n \cos 2n\omega_3 \quad (1)$$

for said 263H lowpass filter:

$$c_0 + 2 \sum_{n=1} c_n \cos n(\omega_3 + \tfrac{1}{2}\omega_2) \tag{12}$$

for said 262H lowpass filter:

$$c_0 + 2 \sum_{n=1} c_n \cos n(-\omega_3 + \tfrac{1}{2}\omega_2) \tag{13}$$

for said vertical lowpass filter:

$$c_0 + 2 \sum_{n=1} c_n \cos n\omega_2 \tag{4}$$

for said horizontal lowpass filter:

$$c_0 + 2 \sum_{n=1} c_n \cos n\omega_1 \tag{14}$$

in the above expressions, H denotes 1 line delay, P is 1 pixel delay. The normalized frequencies $\omega_1$, $\omega_2$, $\omega_3$, respectively to the horizontal, vertical and temporal frequencies are defined as follows:

$$\omega_i = 2\pi f_i / f_{si} \tag{8}$$

in which i=1, 2, 3 and the corresponding sampling frequencies $f_{si}$ are $$f_{s1} = 4f_{sc} = 14.32 \text{ MHz} \tag{9}$$

$$f_{s2} = 262.5 \text{ c/ph or cycle/picture heigh} \tag{10}$$

$$f_{s3} = 59.94 \text{ Hz} \tag{11}$$

in which $f_{s1} = 13.50$ MHz can be used with similar filters.

25. A diamond shaped multidimensional filter circuit for decoding PAL composite video signals, said diamond shaped filter circuit comprising a series configuration of separable bandpass filters connected at an input to said composite video signals, a matching delay circuit connected to said input and providing a delayed output signal matching the delay of the resulting signal of said series of separable filters, said series configuration of separable filters producing a chrominance signal at an output signal thereof, an adder circuit having a positive and negative input, said negative input being connected to said chrominance output to receive said chrominance signal, said delayed output signal being connected to said positive output, said adder yielding a bandstop luminance signal at an output thereof, said series configuration of separable filters providing a bandpass filter, said input PAL composite video signal being quasi-orthogonally sampled at $4f_{sc}$, said series configuration of separable filters comprising a series combination of separable filters to produce horizontal-vertical diamond shaped bandpass filter, said series configuration of separable filters producing a bandpass chrominance output signal, all said filters being connected in series.

26. A diamond shaped multidimensional filter circuit as claimed in claim 25 wherein said series combination of separable filters is a spatial diamond shaped bandpass filter comprised of a vertical bandpass filter, a H+2P bandpass filter, a H−2P bandpass filter, and a horizontal bandpass filter all connected together in series.

27. A diamond shaped multidimensional filter circuit as claimed in claim 26 wherein said spatial diamond shaped bandpass filter has transfer functions determined by the following mathematical expressions, for said vertical bandpass filter:

$$c_0 + 2 \sum_{n=1} c_n \cos 2n\omega_2 \tag{18}$$

said H+2P bandpass filter:

$$c_0 + 2 \sum_{n=1} c_n \cos 2n(2\omega_1 + \omega_2) \tag{17}$$

said H−2P bandpass filter:

$$c_0 + 2 \sum_{n=1} c_n \cos 2n(2\omega_1 - \omega_2) \tag{16}$$

said horizontal bandpass filter:

$$c_0 + 2 \sum_{n=1} c_n \cos 2n\omega_1 \tag{15}$$

the normalized frequencies $\omega_1$, $\omega_2$, $\omega_3$ respectively to the horizontal, vertical and temporal frequencies are defined as follows:

$$\omega_i = 2\pi f_i / f_{si}; i = 1,2,3 \tag{21}$$

in which the corresponding sampling frequencies are:

$$f_{s1} = 4f_{sc} = 17.73 \text{ MHz} \tag{22}$$

$$f_{s2} = 312.5 \text{ c/ph} \tag{23}$$

$$f_{s3} = 50 \text{ Hz} \tag{24}$$

28. A diamond shaped multidimensional filter circuit as claimed in claim 25 wherein said series configuration of separable bandpass filters comprises a series combination of separable filters to produce a temporal-vertical bandpass filter.

29. A diamond shaped multidimensional filter circuit as claimed in claim 28 wherein said series configuration of separable filters filter is comprised of a 313 H highpass filter, a two field non-separable or a 312 H bandpass filter, a vertical bandpass filter, a H+2P bandpass filter, a H−2P bandpass filter and a horizontal bandpass filter, all said filters being connected in series.

30. A diamond shaped multidimensional filter circuit as claimed in claim 29 wherein said series configuration of separable filters have transfer functions determined by the following mathematical expressions, for said 313 H highpass filter:

$$c_0 + 2 \sum_{n=1} c_n \cos n(\omega_3 - 1/2\, \omega_2) \tag{19}$$

said two field non separable bandpass filter:

$$\{c_0 + 2c_1 \cos(\omega_3 + 1/2\,\omega_2) + 2c_2 \cos(\omega_3 - 3/2\,\omega_2) + \tag{20}$$
$$2c_3 \cos 2\omega_2 + 2c_4 \cos(\omega_3 + 5/2\,\omega_2) +$$
$$2c_5 \cos(\omega_3 - 7/2\,\omega_2) + 2c_6 \cos 4\omega_2 + \ldots \}$$

said 312 H bandpass filter:

$$c_0 + 2 \sum_{n=1} c_n \cos n(2\omega_3 - \omega_2) \qquad (25)$$

said vertical bandpass filter:

$$c_0 + 2 \sum_{n=1} c_n \cos 2n\omega_2 \qquad (18)$$

said H+2P bandpass filter:

$$c_0 + 2 \sum_{n=1} c_n \cos 2n(2\omega_1 + \omega_2) \qquad (17)$$

said H−2P bandpass filter:

$$c_0 + 2 \sum_{n=1} c_n \cos 2n(2\omega_1 - \omega_2) \qquad (16)$$

said horizontal bandpass filter:

$$c_0 + 2 \sum_{n=1} c_n \cos 2n\omega_1 \qquad (15)$$

the normalized frequencies $\omega_1$, $\omega_2$, $\omega_3$ respectively to the horizontal, vertical and temporal frequencies are defined as follows:

$$\omega_i = 2\pi f_i/f_{si}; i = 1,2,3 \qquad (21)$$

in which the corresponding sampling frequencies are:

$$f_{s1} = 4f_{sc} = 17.73 \text{ MHz} \qquad (22)$$

$$f_{s2} = 312.5 \text{ c/ph} \qquad (23)$$

$$f_{s3} = 50 \text{ Hz} \qquad (24)$$

31. A multidimensional filter circuit for enconding PAL composite video signals, said circuit comprising a chroma quadrature modulator connected to a chrominance input signal, a matching delay circuit connected to a luminance input signal, said chroma quadrature modulator having an output connected to a negative input of a first adder circuit, said first adder circuit having a positive input connected to said luminance input signal, said adder circuit yielding an output signal which is fed to a bandpass filter formed of a series configuration of separable filters, the output of said bandpass filter being connected to a negative input of a second adder circuit, said delayed luminance output signal being fed to a positive input of said second adder circuit whereby said second adder circuit yields a composite video output signal, said series configuration of separable filters being a bandpass filter comprised of a 313 H highpass filter, a two filed non-separable or 312 H bandpass filter, a vertical bandpass filter and a horizontal bandpass filter, all said filters being connected in series.

32. A method of decoding NTSC composite video signals by the use of a diamond shaped multidimensional filter circuit comprised of a series configuration of separable bandpass filters connected at an input to said composite video signals, a matching delay circuit connected to said input and providing a delayed output signal matching the delay of the resulting signal of said series of separable filters, said series configuration of separable filters producing a chrominance signal at an output thereof, and adder circuit having a positive and negative input, said negative input being connected to said chrominance output to receive said chrominance signal, said delayed output signal being connected to said positive output, said adder yielding a bandstop luminance signal at an output thereof, said series configuration of separable filters being bandpass filters comprised of two series combination of separable filters to produce a temporal-vertical bandpass filter and a series connected horizontal-vertical bandpass filter, said series configuration of separable filters comprising a series combination of separable filters to produce a horizontal-vertical diamond shaped bandpass filter, said series configuration of separable filters producing a bandpass chrominance output signal, said method comprising the steps of:

(i) feeding said composite video signals to an input of a series configuration of separable filters, (ii) feeding said composite video signals to a matching delay circuit, (iii) providing a delayed video output signal by said matching delay circuit which is matched to the delay caused by said series of separable filters, (iv) producing a chrominance signal at an output of said series of separable filters to produce an output chrominance signal, (v) also feeding said output of said separable filters to an adder circuit negative input, (vi) feeding said delayed video output signal to a positive input of said adder to produce a bandstop luminance signal at an output thereof.

33. A method of encoding composite video signals by the use of a diamond shaped multidimensional filter circuit, said method comprising the steps of:

(i) feeding a chrominance input signals to two series configuration of separable unidimensional lowpass filters to produce lowpass chrominance output signals, (ii) modulating said lowpass chrominance output signals to produce a modulated chrominance signal, (iii) feeding a luminance input signal to a series configuration of separable unidimensional filters to produce a bandpass luminance output signal and to a matching delay circuit to provide a delayed luminance output signal matching the delay of said configuration of separable unidimensional lowpass filters, (iv) feeding said delayed luminance output signal and said bandpass luminance output signal to a positive input and negative input respectively of an adder circuit to provide a bandstop luminance output signal, (v) delay matching said bandstop luminance output signal to produce delayed bandstop luminance output signal having the same delay as said modulated chroma output signal, and (vi) feeding said modulated chroma output signal and said delayed bandstop luminance output signal to an adder circuit to produce at an output thereof a composite video signal.

34. A method as claimed in claim 33 wherein said composite video output signal is an NTSC, PAL or ATV video signal.

35. A method of decoding NTSC composite video signals by the use of a diamond shaped multidimensional filter circuit for decoding NTSC composite video signals, said diamond shaped filter circuit comprising a series configuration of separable bandpass filters connected at an input to said composite video signals, a matching delay circuit connected to said input and providing a delayed output signal matching the delay of the resulting signal of said series configuration of separable bandpass filters, said series configuration of separable bandpass filters producing a chrominance signal at an output thereof, and adder circuit having a positive and negative input, said negative input being connected to said chrominance output to receive said chrominance signal, said delayed output signal being connected to said positive output, said adder yielding a bandstop luminance signal at an output thereof, said series configuration of separable bandpass filters being an intrafield diamond shaped bandpass filters comprised of an optional temporal bandpass filter operating in the temporal frequency domain, a vertical highpass filter, a 1H+2P lowpass filter, 1H−2P lowpass filter and a horizontal bandpass filter, all connected in series, said method comprising the steps of:
(i) feeding said composite video signals to an input of a series configuration of separable filters,
(ii) feeding said composite video signals to a matching delay circuit,
(iii) providing a delayed video output signal by said matching delay circuit which is matched to the delay caused by said series of separable filters,
(iv) producing a chrominance signal at an output of said series of separable filters to produce an output chrominance signal,
(v) also feeding said output of said separable filters to an adder circuit negative input,
(vi) feeding said delayed video output signal to a positive input of said adder to produce a bandstop luminance signal at an output thereof.

36. A method of decoding NTSC composite video signals by the use of an interframe diamond shaped multidimensional filter circuit for decoding NTSC composite video signals, said diamond shaped multidimensional filter circuit comprising a series configuration of separable bandpass filters connected at an input to said composite video signals, a matching delay circuit connected to said input and providing a delayed output signal matching the delay of the resulting signal of said series of separable bandpass filters, said series configuration of separable bandpass filters producing a chrominance signal at an output thereof, an adder circuit having a positive and negative input, said negative input being connected to said chrominance output to receive said chrominance signal, said delayed output signal being connected to said positive output, said adder yielding a bandstop luminance signal at an output thereof, said series combination of separable bandpass filters being a separable filter and comprised of a temporal bandpass filter, a 526H lowpass filters, a 524 H lowpass filter, a vertical highpass filter and a horizontal bandpass filter, all connected together in series, said method comprising the steps of:
(i) feeding said composite video signals to an input of a series configuration of separable bandpass filters,
(ii) feeding said composite video signals to a matching delay circuit,
(iii) providing a delayed video output signal by said matching delay circuit which is matched to the delay caused by said series configuration of separable bandpass filters,
(iv) producing a chrominance signal at an output of said series configuration of separable bandpass filters to produce an output chrominance signal,
(v) also feeding said output of said series configuration of separable bandpass filters to an adder circuit negative input,
(vi) feeding said delayed video output signal to a positive input of said adder to produce a bandstop luminance signal at an output thereof.

37. A method of decoding NTSC composite video signals by the use of an interfield diamond shaped multidimensional filter circuit for decoding NTSC composite video signals, said diamond shaped multidimensional filter circuit comprising a series configuration of separable bandpass filters connected at an input to said composite video signals, a matching delay circuit connected to said input and providing a delayed output signal matching the delay of the resulting signal of said series of separable filters, said series configuration of separable filters producing a chrominance signal at an output thereof, an adder circuit having a positive and negative input, said negative input being connected to said chrominance output to receive said chrominance signal, said delayed output signal being connected to said positive output, said adder yielding a bandstop luminance signal at an output thereof, wherein said series configuration of separable bandpass filters being a separable temporal-vertical diamond shaped bandpass filter for both chroma and Fukinuki hole informations in NTSC signals and comprised of a temporal bandpass filter connected to said input containing said composite video signal, said temporal bandpass filter having an output connected to an input of two parallel branches of filters, one branch formed by a 263H lowpass filter connected in series with a 262H highpass filter, the other branch formed by a 263H highpass filter connected in series with a 262H lowpass filter, said two branches of filters being connected at their outputs to a respective input of a further adder circuit where these signals are combined and fed as a composite signal to a vertical highpass filter which is connected in series with a horizontal bandpass filter producing a bandpass chrominance output signal, said method comprising the steps of:
(i) feeding said composite video signals to an input of a series configuration of separable bandpass filters,
(ii) feeding said composite video signals to a matching delay circuit,
(iii) providing a delayed video output signal by said matching delay circuit which is matched to the delay caused by said series configuration of separable bandpass filters,
(iv) producing a chrominance signal at an output of said series configuration of separable bandpass filters to produce an output chrominance signal,
(v) also feeding said output of said separable configuration of separable bandpass filters to an adder circuit negative input,
(vi) feeding said delayed video output signal to a positive input of said adder to produce a bandstop luminance signal at an output thereof.

38. A multidimensional filter circuit for decoding PAL composite video signals, said multidimensional filter circuit comprising a series configuration of separable bandpass filters connected at an input to said composite video signals, a matching delay circuit connected to said input and providing a delayed output signal matching the delay of the resulting signal of said series of separable filters, said series configuration of separable filters producing a chrominance signal at an output signal thereof, an adder circuit having a positive and negative input, said negative input being connected to said chrominance output to receive said chrominance signal, said delayed output signal being connected to said positive output, said adder yielding a bandstop luminance signal at an output thereof, said series configuration of separable filters providing a bandpass filter, said input PAL composite video signal being quasi-orthogonally sampled at $4f_{sc}$, said bandpass filter is comprised of a series of filters including 313 H highpass filter, a two field non-separable or 312 H bandpass filter, a vertical bandpass filter and a horizontal bandpass filter.

39. A multidimensional filter circuit as claimed in claim 38 wherein said series of filters has transfer functions determined by the following mathematical expressions for said 313 H highpass filter:

$$c_0 + 2 \sum_{n=1} c_n \cos n(\omega_3 + 1/2\, \omega_2) \quad (19)$$

$$c_0 + 2 \sum_{n=1} c_n \cos n(\omega_3 - 1/2\, \omega_2) \quad (19)$$

said two field non separable bandpass filter:

$$\{c_0 + 2c_1 \cos(\omega_3 + 1/2\, \omega_2) + 2c_2 \cos(\omega_3 - 3/2\, \omega_2) + \quad (20)$$
$$2c_3 \cos 2\omega_2 + 2c_4 \cos(\omega_3 + 5/2\, \omega_2) +$$
$$2c_5 \cos(\omega_3 - 7/2\, \omega_2) + 2c_6 \cos 4\omega_2 + \ldots \}$$

said 312 H bandpass filter:

$$c_0 + 2 \sum_{n=1} c_n \cos n(2\omega_3 - \omega_2) \quad (25)$$

said vertical bandpass filter:

$$c_0 + 2 \sum_{n=1} c_n \cos 2n\omega_2 \quad (18)$$

said horizontal bandpass filter:

$$c_0 + 2 \sum_{n=1} c_n \cos 2n\omega_1 \quad (15)$$

the normalized frequencies $\omega_1$, $\omega_2$, $\omega_3$ respectively to the horizontal, vertical and temporal frequencies are defined as follows:

$$\omega_i = 2\pi f_i / f_{si}; \; i=1,2,3 \quad (21)$$

in which the corresponding sampling frequencies are:

$$f_{s1} = 4f_{sc} = 17.73 \text{ MHz} \quad (22)$$

$$f_{s2} = 312.5 \text{ c/ph} \quad (23)$$

$$f_{s3} = 50 \text{ Hz} \quad (24)$$

40. An interfield diamond shaped multidimensional filter circuit for encoding NTSC composite video signals, said circuit comprising a chroma quadrature modulator connected to a chrominance input signal, a matching delay circuit connected to a luminance input signal, said chroma quadrature modulator having an output connected to a negative input of a first adder circuit, said first adder circuit having a positive input connected to said luminance input signal, said adder circuit yielding an output signal which is fed to a bandpass filter formed of a series configuration of separable filters, the output of said bandpass filter being connected to a negative input of a second adder circuit, said delayed luminance output signal being fed to a positive input of said second adder circuit whereby said second adder circuit yields a composite video output signal, said series configuration of separable bandpass filters being a separable temporal-vertical diamond shaped bandpass filter for both chroma and Fukinuki hole informations in NTSC signals and comprised of a temporal bandpass filter connected to said input containing said composite video signal, said temporal bandpass filter having an output connected to an input of two parallel branches of filters, one branch formed by a 263H lowpass filter connected in series with a 262H highpass filter, the other branch formed by a 263H highpass filter connected in series with a 262H lowpass filter, said two branches of filters being connected at their outputs to a respective input of a further adder circuit where these signals are combined and fed as a composite signal to a vertical highpass filter which is connected in series with a horizontal bandpass filter producing a bandpass chrominance output signal.

41. A diamond shaped multidimensional filter circuit for encoding NTSC composite video signals, said circuit comprising a chroma quadrature modulator connected to a chrominance input signal, a matching delay circuit connected to a luminance input signal, said chroma quadrature modulator having an output connected to a negative input of a first adder circuit, said first adder circuit having a positive input connected to said luminance input signal, said adder circuit yielding an output signal which is fed to a bandpass filter formed of a series combination of separable filters, the output of said bandpass filter being connected to a negative input of a second adder circuit, said delayed luminance output signal being fed to a positive input of said second adder circuit yields a composite video output signal, said series combination of separable filters being a separable temporal-vertical diamond shaped bandpass filter and comprised of a temporal bandpass filter, a 526H lowpass filter, a 524H lowpass filter, a vertical highpass filter and a horizontal bandpass filter, all connected together in series.

42. A diamond shaped multidimensional filter circuit for encoding composite video signals, said circuit comprising a chroma quadrature modulator connected to a chrominance input signal, a matching delay circuit connected to a luminance input signal, said chroma quadrature modulator having an output connected to a negative input of a first adder circuit, said first adder circuit having a positive input connected to said luminance input signal, said adder circuit yielding an output signal which is fed to a bandpass filter formed of a series configuration of separable filters, the output of said bandpass filter being connected to a negative input of a second adder circuit, said delayed luminance output signal being fed to a positive input of said second adder circuit whereby said second adder circuit yields a composite video output signal, said series configuration of separable filters comprising a series combination of separable filters to produce a horizontal-vertical diamond shaped bandpass filter, said series configuration of separable filters producing a bandpass chrominance output signal.

43. A diamond shaped multidimensional filter circuit as claimed in claim 42, wherein said series configuration of separable filters comprises a series combination of separable filters to produce a temporal-vertical bandpass filter.

44. A diamond shaped multidimensional filter circuit as claimed in claim 43, wherein said temporal-vertical bandpass filter is a diamond shaped bandpass filter.

45. A diamond shaped multidimensional filter circuit as claimed in claim 44, wherein said composite video signal is a NTSC video signal, said temporal-vertical diamond shaped bandpass filter is comprised of four separable filters and namely a temporal bandpass filter, a 526H lowpass filter, a 524H lowpass filter and a vertical highpass filter; said four filters being connected in an operational series arrangement, said composite video signal input being orthogonally samples at four times the color subcarrier frequency or at 13.5 MHz.

46. A diamond shaped multidimensional filter circuit as claimed in claim 42, 43 or 44 wherein said composite video signal is a NTSC signal, said horizontal-vertical diamond shaped bandpass filter is comprised of four separable filters and namely a vertical highpass filter, a 1H+2 P lowpass filter, a 1H−2 P lowpass filter and a horizontal bandpass filter, said four filters being connected in an operational series arrangement.

47. A diamond shaped multidimensional filter circuit as claimed in claim 44, wherein said composite video signal is a PAL video signal, said series combination of separable filters being a bandpass filter comprised of a 313H highpass filter, a two field non-separable or a 312H bandpass filter, a vertical bandpass filter, a H+2 P bandpass filter, a H−2 P bandpass filter and a horizontal bandpass filter, all said filters being connected in series.

48. A diamond shaped multidimensional filter circuit as claimed in claim 42, wherein said composite video signal is a PAL video signal, said series configuration of separable filters being a spatial diamond shaped bandpass filter comprised of a vertical bandpass filter, a H+2 P bandpass filter, a H−2 P bandpass filter and a horizontal bandpass filter, all connected together in series.

49. A diamond shaped multidimensional filter circuit as claimed in claim 42, wherein said series combination of separable filters being an intrafield diamond shaped bandpass filter comprised of an optional temporal bandpass filter operating in the temporal frequency domain, a vertical highpass filter, a 1H+2 P lowpass filter, a 1H−2 P lowpass filter and a horizontal bandpass filter, all connected together in series.

* * * * *